United States Patent
Ge et al.

(10) Patent No.: US 12,447,442 B2
(45) Date of Patent: Oct. 21, 2025

(54) MICROFILTRATION MEMBRANE

(71) Applicant: EMD MILLIPORE CORPORATION, Burlington, MA (US)

(72) Inventors: Jijun Ge, Burlington, MA (US); Xiaozhu Zhou, Burlington, MA (US)

(73) Assignee: EMD Millipore Corporation, Burlington, MA (US)

( * ) Notice: Subject to any disclaimer, the term of this patent is extended or adjusted under 35 U.S.C. 154(b) by 535 days.

(21) Appl. No.: 17/778,653

(22) PCT Filed: Nov. 18, 2020

(86) PCT No.: PCT/US2020/061054
§ 371 (c)(1),
(2) Date: May 20, 2022

(87) PCT Pub. No.: WO2021/101995
PCT Pub. Date: May 27, 2021

(65) Prior Publication Data
US 2023/0015162 A1    Jan. 19, 2023

Related U.S. Application Data

(60) Provisional application No. 62/938,412, filed on Nov. 21, 2019.

(51) Int. Cl.
| | |
|---|---|
| *B01D 61/14* | (2006.01) |
| *B01D 61/18* | (2006.01) |
| *B01D 63/06* | (2006.01) |
| *B01D 67/00* | (2006.01) |
| *B01D 69/02* | (2006.01) |
| *B01D 71/28* | (2006.01) |
| *B01D 71/58* | (2006.01) |
| *B01D 71/68* | (2006.01) |
| *B01D 71/82* | (2006.01) |

(52) U.S. Cl.
CPC .......... *B01D 61/147* (2013.01); *B01D 61/18* (2013.01); *B01D 63/067* (2013.01);
(Continued)

(58) Field of Classification Search
CPC ............ B01D 61/147; B01D 61/18; B01D 67/00091; B01D 67/0011; B01D 67/0013;
(Continued)

(56) References Cited

U.S. PATENT DOCUMENTS 4,250,029 A * 2/1981 Kiser ................ B01D 67/0088
210/500.34
5,178,765 A * 1/1993 Hu ........................ B01D 71/68
210/651
(Continued)

FOREIGN PATENT DOCUMENTS

CN    103055709 A    4/2013
DE    102009004848 B3    4/2010
(Continued)

OTHER PUBLICATIONS

English Translation of and Notice of Reasons for Rejection for Japanese Patent Application No. 2022-529795 (dispatched Nov. 1, 2024).
(Continued)

*Primary Examiner* — Youngsul Jeong
(74) *Attorney, Agent, or Firm* — EMD Millipore Corporation

(57) ABSTRACT

The present application relates to a multizone, unsupported, microporous, high throughput membrane. The membrane includes a first microporous zone, a second microporous zone, and a third microporous zone, where the third microporous zone is positioned between the first and second microporous zones, with the first, second, and third microporous zones being integral with one another. Further aspects of the present application include a process for making the membrane and a filtration cartridge with the membrane of the present application.

26 Claims, 11 Drawing Sheets

(52) U.S. Cl.
CPC ... *B01D 67/0009* (2013.01); *B01D 67/00091* (2022.08); *B01D 67/0011* (2013.01); *B01D 67/0013* (2013.01); *B01D 67/0088* (2013.01); *B01D 69/02* (2013.01); *B01D 71/281* (2022.08); *B01D 71/283* (2022.08); *B01D 71/58* (2013.01); *B01D 71/68* (2013.01); *B01D 71/82* (2013.01); *B01D 2323/02* (2013.01); *B01D 2323/06* (2013.01); *B01D 2323/08* (2013.01); *B01D 2323/30* (2013.01); *B01D 2323/34* (2013.01); *B01D 2323/60* (2022.08); *B01D 2325/022* (2013.01); *B01D 2325/02831* (2022.08); *B01D 2325/04* (2013.01); *B01D 2325/24* (2013.01); *B01D 2325/36* (2013.01)

(58) Field of Classification Search
CPC ............ B01D 67/0088; B01D 67/0009; B01D 63/067; B01D 71/58; B01D 71/68; B01D 71/82; B01D 71/281; B01D 71/283; B01D 2323/60; B01D 2323/02; B01D 2323/06; B01D 2323/08; B01D 2323/30; B01D 2323/34; B01D 2325/022; B01D 2325/04; B01D 2325/24; B01D 2325/36; B01D 2325/02831
See application file for complete search history.

(56) References Cited

U.S. PATENT DOCUMENTS

| | | |
|---|---|---|
| 6,347,711 B1 | 2/2002 | Goebel et al. |
| 6,736,971 B2 * | 5/2004 | Sale ..................... B01D 71/56 427/244 |
| 2008/0004205 A1 | 1/2008 | Tkacik et al. |
| 2013/0056420 A1 | 3/2013 | Wang et al. |
| 2015/0157986 A1 | 6/2015 | Thom et al. |
| 2015/0190760 A1 * | 7/2015 | Singh ..................... G03F 7/26 210/500.21 |

FOREIGN PATENT DOCUMENTS

| | | | |
|---|---|---|---|
| EP | 0152551 A1 | 8/1985 | |
| EP | 0605470 A1 | 7/1994 | |
| EP | 2891515 A1 * | 7/2015 | ......... B01D 67/0013 |
| GB | 2122101 A | 1/1984 | |
| JP | 2005-506168 A | 3/2005 | |
| JP | 2005-516754 A | 6/2005 | |
| JP | 2007-111572 A | 5/2007 | |
| JP | 2015-128761 A | 7/2015 | |
| KR | 10-2009-0126796 A | 12/2009 | |
| KR | 20090126796 A | 12/2009 | |
| WO | 93/05871 A1 | 4/1993 | |
| WO | 02/11868 A1 | 2/2002 | |
| WO | 03/066202 A1 | 8/2003 | |

OTHER PUBLICATIONS

International Search Report and Written Opinion for corresponding International Application No. PCT/US2020/061054 (mailed Apr. 12, 2021).

International Preliminary Report on Patentability received for PCT Application No. PCT/US2020/061054, mailing date Jun. 2, 2022, 7 Pages.

International Search Report and Written Opinion received for PCT Application No. PCT/US2020/061054, mailing date Apr. 12, 2021, 9 Pages.

* cited by examiner

MICROFILTRATION MEMBRANE

This application is a national stage application under 35 U.S.C. § 371 of International Application No. PCT/US2020/061054, filed Nov. 18, 2020, which claims priority benefit of U.S. Provisional Patent Application No. 62/938,412, filed Nov. 21, 2019, which are hereby incorporated by reference in their entirety.

FIELD

The present application relates to a microfiltration membrane which achieves superior throughput performance.

BACKGROUND

Throughput performance is becoming more and more important for filtration applications. One way to improve filter throughput is to use multiple layers of membranes in a filtration device. For example, Millipore Express® SHC manufactured by MilliporeSigma contains two layers of membrane. Sartoguard NF manufactured by Sartorius contains three layers of separation media. However, this approach results in increased manufacturing cost because of the multiple membrane layers that are required to achieve the desired throughput.

Another method to improve filter throughput is to optimize the membrane structure. U.S. Pat. No. 7,942,274 to Kools, et al. discloses a method to make a high throughput membrane using additional steps to modify the tight surface of the membrane by ablation or solvation. Because the modification is a separate process step, extra cost is added to the resultant membrane.

U.S. Patent Application Publication No. 2014/0339166A to Wixwat, et al. discloses a method to make high throughput membranes with channels in the porous membrane portions created by removing introduced fibers. U.S. Patent Application Publication No. 2014/0339164A to Liang, et al. and U.S. Patent Application Publication No. 2014/0339165A to Han, et al. disclose a method to make high throughput membranes by removing introduced particles from the first porous portion of the membranes. Both of these processes need extra effort to mix particles or fibers into the membrane formulations, and need additional processing steps to remove the particles or fibers.

Asymmetric membranes were developed to gain high flux, which also leads to improved throughput when compared to symmetric membranes. See U.S. Pat. No. 4,261,834 to deWinter. The most common asymmetric membrane has a gradient structure, in which the pore size gradually and continually increases from one surface to the other. See U.S. Pat. No. 4,629,563 to Wrasidlo. The other type of asymmetric membrane structure has a retentive zone inside the asymmetric membrane, where the pore size decreases and then increases again. See U.S. Pat. No. 4,933,081 to Sasaki, et al. The benefits of the "hour-glass" type of asymmetric membrane include high flow rates and a reduced risk of retention degradation due to surface scratches. However, since it is formed by a single zone casting process, the membrane structure is heavily dependent upon the membrane formation processes, especially the air exposure process steps. This makes the process less robust and could, therefore, produce a non-uniform membrane.

Membranes with multizone structures are scientifically more attractive since each zone can be fine-tuned to achieve an overall improved performance. A multizone microfiltration membrane comprising at least one retentive symmetric zone and at least one pre-filtration zone was first patented using sequential casting. See U.S. Pat. No. 5,620,790 to Holzki, et al. As stated in U.S. Pat. No. 7,208,200 to Kools, sequential casting will likely create a clear demarcation line or region with a dense and skin-like structure between the retentive symmetric zone and pre-filtration zone. This will likely lead to a drastic decline in the membrane's throughput due to particle accumulation at the interface. Moreover, the symmetric retentive zone morphology will lead to low throughput. U.S. Pat. No. 7,208,200 to Kools discloses a co-cast process that smooths the zone to zone transition and, thus, leads to improved performance. However, there is no mention of how to achieve high throughout performance.

U.S. Pat. No. 8,840,791 to Wang, et al. discloses a multizone microfiltration membrane with a three-zone structure, including an asymmetric zone, a symmetric and/or asymmetric zone, and an interface zone between those two zones. The disclosed membranes were made via a two-step sequential cast process, as set forth in U.S. Pat. No. 5,620,790 to Holzki, et al. The membrane fabrication process indicates that the interface zone was not purposely made as a result of casting an additional lacquer. Instead, as stated in U.S. Pat. No. 8,840,791 to Wang, et al., it is formed by a mixture of first and second polymer lacquers. No mixing together of the individual zones takes place as stated in U.S. Pat. No. 5,620,790 to Holzki, et al. Moreover, there is no mention about casting the additional filtration zones to enable significantly improved membrane throughput in this patent.

The present application is directed to overcoming these and other deficiencies in the art.

SUMMARY

The present application relates to a multizone, unsupported, microporous, high throughput filtration membrane having a bubble point (in psi) of from about 15 to 50, and a breaking strain of at least 20%. The membrane includes a first microporous zone which is symmetric or asymmetric, a second microporous zone which is symmetric or asymmetric, and a third microporous zone which is asymmetric. The third microporous zone is positioned between the first and second microporous zones, with the first, second, and third microporous zones being integral with one another. The membrane has a throughput (in $L/m^2$), when measured using whey broth, which is greater than $-11.65x+1088.5$, where x is the bubble point (in psi), or a throughput, when using EMD Soy broth, which is greater than $-20.23x+1369.4$, where x is the bubble point (in psi).

A second aspect of the present application relates to a filtration cartridge including a housing, and a membrane of the present application positioned within the housing.

A further aspect of the present application relates to the process of forming a multizone, microporous, high throughput filtration membrane, with a breaking strain of at least 20%. This process includes providing solutions of a polymer and a solvent for the polymer, and simultaneously or sequentially casting the solutions as 3 separate zones onto a support to form a multizone liquid sheet, effecting a phase separation of the 3 separate zones of solutions, and separating the multizone, microporous, high throughput filtration membrane from the support. The membrane comprises a first microporous zone which is symmetric or asymmetric, a second microporous zone which is symmetric or asymmetric, and a third microporous zone which is asymmetric, where the third microporous zone is positioned between the first and second microporous zones. The first, second, and third microporous zones are integral with one another, and the membrane has a throughput (in L/m²), when measured using whey broth, which is greater than −11.65x+1088.5, where x is the bubble point (in psi), or a throughput, when using EMD Soy broth, which is greater than −20.23x+1369.4, where x is the bubble point (in psi).

Another aspect of the present application relates to a multizone, unsupported, microporous, high throughput filtration membrane where the membrane has a first microporous zone which is symmetric or asymmetric, a second microporous zone which is symmetric or asymmetric, and a third microporous zone which is asymmetric. The third microporous zone is positioned between the first and second microporous zones, and the first, second, and third microporous zones are integral with one another. Additionally, the first, second, and/or third microporous zones comprise a blend of a first polymer selected from the group consisting of PVDF, polyamides, polyimides, polyether sulphones, polysulphones, polyaryl sulphones, PVC, PET, polycarbonates, cellulose, regenerated cellulose, cellulose esters, polystyrenes, polyetherimides, acrylic polymers, methacrylic polymers, and copolymers of acrylic or methacrylic polymers, and a second polymer wherein the second polymer is selected from one or more hydrophilic polymers from the group consisting of polyacrylic acid, polyvinylalcohol, polyvinyl acetate, polyvinylpyrrolidone, polyethyleneglycol, polyvinylpyridine, polyethyleneimine, and polyoxazoline. The membrane has a breaking strain of at least 20%, and has a throughput (in L/m²), when measured using whey broth, which is greater than −11.65x+1088.5, where x is the bubble point (in psi), or a throughput, when using EMD Soy broth, which is greater than −20.23x+1369.4, where x is the bubble point (in psi).

A further aspect of the present application relates to a filtration cartridge including a housing, and a pleated membrane positioned within the housing, where the membrane has a first microporous zone which is symmetric or asymmetric, a second microporous zone which is symmetric or asymmetric, and a third microporous zone which is asymmetric. The third microporous zone is positioned between the first and second microporous zones with the first, second, and third microporous zones being integral with one another. The first, second, and/or third microporous zones include a blend of a first polymer selected from the group consisting of PVDF, polyamides, polyimides, polyether sulphones, polysulphones, polyaryl sulphones, PVC, PET, polycarbonates, cellulose, regenerated cellulose, cellulose esters, polystyrenes, polyetherimides, acrylic polymers, methacrylic polymers, and copolymers of acrylic or methacrylic polymers, and a second polymer wherein the second polymer is selected from one or more hydrophilic polymers from the group consisting of polyacrylic acid, polyvinyl alcohol, polyvinylacetate, polyvinylpyrrolidone, polyethyleneglycol, polyvinylpyridine, polyethyleneimine, and polyoxazoline. The membrane has a breaking strain of at least 20%, and has a throughput (in L/m²), when measured using whey broth, which is greater than −11.65x+1088.5, where x is the bubble point (in psi) or a throughput, when using EMD Soy broth, which is greater than −20.23x+1369.4, where x is the bubble point (in psi); and where the housing contains greater than 0.11 m² of effective membrane area per inch of housing height.

A further aspect of the present application relates to a multizone, unsupported, microporous, high throughput filtration membrane having a bubble point (in psi) of from about 15 to 50, and a breaking strain of at least 20%. The membrane includes a first microporous zone which is symmetric, a second microporous zone which is asymmetric, and a third microporous zone which is asymmetric. The third microporous zone is positioned between the first and second microporous zones, with the first, second, and third microporous zones being integral with one another. The membrane has a throughput (in L/m²), when measured using whey broth, which is greater than −11.65x+1088.5, where x is the bubble point (in psi), or a throughput, when using EMD Soy broth, which is greater than −20.23x+1369.4, where x is the bubble point (in psi).

An additional aspect of the present application relates to a multizone, unsupported, microporous, high throughput filtration membrane having a bubble point (in psi) of from about 15 to 50, and a breaking strain of at least 20%. The membrane includes a first microporous zone which is symmetric, a second microporous zone which is symmetric and a third microporous zone which is asymmetric. The third microporous zone is positioned between the first and second microporous zones, with the first, second, and third microporous zones being integral with one another. The membrane has a throughput (in L/m²), when measured using whey broth, which is greater than −11.65x+1088.5, where x is the bubble point (in psi), or a throughput, when using EMD Soy broth, which is greater than −20.23x+1369.4, where x is the bubble point (in psi).

Another aspect of the present application relates to a multizone, unsupported, microporous, high throughput filtration membrane having a bubble point (in psi) of from about 15 to 50, and a breaking strain of at least 20%. The membrane includes a first microporous zone which is asymmetric, a second microporous zone which is symmetric and a third microporous zone which is asymmetric. The third microporous zone is positioned between the first and second microporous zones, with the first, second, and third microporous zones being integral with one another. The membrane has a throughput (in L/m²), when measured using whey broth, which is greater than −11.65x+1088.5, where x is the bubble point (in psi), or a throughput, when using EMD Soy broth, which is greater than −20.23x+1369.4, where x is the bubble point (in psi).

A further aspect of the present application relates to a multizone, unsupported, microporous, high throughput filtration membrane having a bubble point (in psi) of from about 15 to 50, and a breaking strain of at least 20%. The membrane includes a first microporous zone which is asymmetric, a second microporous zone which is asymmetric, and a third microporous zone which is asymmetric. The third microporous zone is positioned between the first and second microporous zones, with the first, second, and third microporous zones being integral with one another. The membrane has a throughput (in L/m²), when measured using whey broth, which is greater than −11.65x+1088.5, where x is the bubble point (in psi), or a throughput, when using EMD Soy broth, which is greater than −20.23x+1369.4, where x is the bubble point (in psi).

Another aspect of the present application relates to an unsupported, microporous, high throughput filtration membrane with a breaking strain of at least 20%, and a bubble point (in psi) of from about 15 to 50. The membrane has a throughput (in L/m²), when measured using whey broth, which is greater than −11.65x+1088.5, where x is the bubble point (in psi), or a throughput, when using EMD Soy broth, which is greater than −20.23x+1369.4, where x is the bubble point (in psi).

A further aspect of the present application relates to an unsupported, microporous, high throughput filtration membrane with a breaking strain of at least 20%, and a bubble point (in psi) of from about 15 to 50. The membrane has a throughput (in L/m²), when measured using whey broth, which is greater than −11.65x+1188.5, where x is the bubble point (in psi), or a throughput, when using EMD Soy broth, which is greater than −20.23x+1469.4, where x is the bubble point (in psi).

A final aspect of the present application relates to an unsupported, microporous, high throughput filtration membrane with a breaking strain of at least 20%, and a bubble point (in psi) of from about 15 to 50. The membrane has a throughput (in L/m²), when measured using whey broth, which is greater than −11.65x+1288.5, where x is the bubble point (in psi), or a throughput, when using EMD Soy broth, which is greater than −20.23x+1569.4, where x is the bubble point (in psi).

In the life science and pharmaceutical filtration applications, many devices are constructed with two or more layers of microfiltration membranes and/or other separation media to achieve high throughput performance. The present application relates to a high throughput microfiltration membrane and its fabrication process. The membrane comprises three casting zones including: (a) a symmetric or asymmetric first zone, (b) a symmetric or asymmetric second zone, and (c) an asymmetric third zone, where the third zone is positioned between the first two. The casting process can be triple slot co-cast or triple slot sequential cast. The membrane of the present application achieves improved throughput over Millipore Express® products of the same pore size.

The resultant membrane of the present application, with its new morphology, and made with this new process, provides significant improvements to the membrane throughput. Additionally, the new morphology of the membrane allows for the membrane to be pleated without degradation of its filtration properties, such as bacteria retention.

DETAILED DESCRIPTION

Figure 1A:
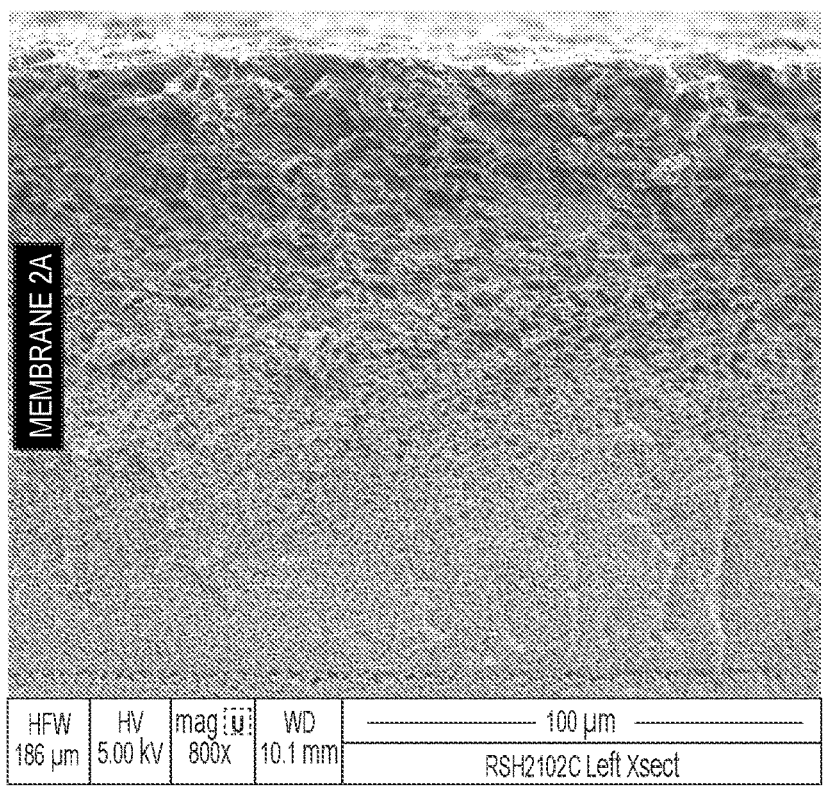
FIGS. 1A-1B are SEM micrographs of the cross section of the high throughput triple zone membrane 2A and membrane 2B with hydrophilic coating, scale bar of 100 μm.

The first aspect of the present application relates to a multizone, unsupported, microporous, high throughput filtration membrane having a bubble point (in psi) of from about 15 to 50, and a breaking strain of at least 20%. The membrane includes a first microporous zone which is symmetric or asymmetric, a second microporous zone which is symmetric or asymmetric, and a third microporous zone which is asymmetric. The third microporous zone is positioned between the first and second microporous zones, with the first, second, and third microporous zones being integral with one another. The membrane has a throughput (in L/m²), when measured using whey broth, which is greater than −11.65x+1088.5, where x is the bubble point (in psi), or a throughput, when using EMD Soy broth, which is greater than −20.23x+1369.4, where x is the bubble point (in psi).

The present application relates to an integral triple zone high throughput porous membrane and its method of production by triple slot casting three polymer mixes onto a support to form a triple zone nascent membrane and immersing the nascent membrane into a liquid coagulation bath to form a porous membrane. After it is formed, the porous membrane is extracted to remove all the solvent and other undesired chemicals, and then dried.

In one embodiment of the present application, the membrane's first microporous zone is 5-140 μm thick, the second microporous zone is 10-140 μm thick, and the third microporous zone is 50-140 μm thick.

As used herein, "symmetric" refers to a membrane or zone having an approximately uniform pore size distribution throughout the membrane or zone.

As used herein, "asymmetric" refers to a membrane or zone where the pores have diameters which vary continuously or discontinuously in the direction of the thickness of the membrane or zone.

In this application, a "layer" of membrane is defined as an independent, membrane sheet. One or more layers of membrane can be used in a filter to remove particles.

In this application, a "zone" is within a layer of membrane having a physical characteristic which is different from surrounding or neighboring zones. A layer of membrane can comprise one, two, three, or even more zones. One or more membrane layers with multiple zones can be used in a filter to remove particles of different sizes.

Likewise, the term "integral" means a structure that although formed of multiple zones and often different polymeric materials, that is bonded together so that it behaves as one structure and does not delaminate or separate in normal use.

The "throughput" of a filter is defined as the amount of fluid that can be processed by a filter until a filtration end point is reached. This endpoint can be based on the maximum processing time to filter a batch or, in the case of constant pressure operation, the minimum filter flux relative to the initial clean water flux. In this application, a filter's throughput is defined as the maximum volume of fluid that could be filtered through a filter. Since filter throughput is determined by the membrane used, the throughput of a membrane is usually measured to predict the filter throughput. In the case of constant pressure operation, the volume of fluid filtered per area of membrane is the membrane throughput. The maximum volume filtered at 90% of initial flux of the membrane is called V90, with the units often expressed as liter per square meter (L/m$^2$). Filter or membrane throughput is often interchangeable with filter or membrane capacity.

The first zone is a thin symmetric or asymmetric zone with 0.02-20 μm in pore size, the preferred pore size is ~2 μm. For some life science applications where high retentive performance is required, this first zone could be made into a dense zone to achieve higher security on retention. The first zone can be about 5-100 μm thick, with an exemplary preferred thickness of ~10 μm.

The second zone can be symmetric or asymmetric with the pore size ranging from 0.05 μm to 200 μm; the preferred pore size needs to be tailored for the best throughput performance over a specific stream. The second zone thickness can be 10-100 μm, with an exemplary preferred thickness of ~20 μm.

The third zone, which is positioned between the first two zones, is asymmetric with a pore size rated from 0.01 to 0.8 μm and thickness from 10 to 150 μm. To make the membrane pleatable, the third zone is typically thick and one preferred thickness is ~110 μm. During the development of present application, it was found that if the third zone is symmetric, the throughput was reduced due to the distinct dense region at the interface.

FIGS. 1A-1B and 2A-2C contain the SEM micrographs of the cross sections of exemplary membranes of the present application. The first zone is located on the bottom, the second zone is on the top, and the third zone is located between the first and second zone.

In a further embodiment of the present application the membrane has a total thickness of 65-300 μm.

In accordance with the present application, the membrane structure in each distinct zone is precisely tailored by applying different mix formulations per the membrane performance requirements. Furthermore, each zone has its own characteristic morphology; there is no distinct interface zone in-between any two adjacent casting zones. Membrane morphology can be transformed depending upon the different casting formulations and process conditions used.

The process of the present application provides precise control of the individual zones of the membrane. Typically, a mix with low solids and low viscosity was made for the top zone (the first zone), which will provide protection to the retentive zone underneath. The second zone is made with the specific viscosity mix to gain the right morphology to achieve the significantly improved throughput. The third zone (middle zone) can be made by using a high viscosity mix to provide the retentive performance and basic capacity. There is no rank of mix viscosity required from 1$^{st}$ mix to 3$^{rd}$ mix, which differs from U.S. Pat. No. 5,620,790 to Holzki et al., which is hereby incorporated by reference in its entirety. Holzki discloses the viscosity of each successive zone of a solution of polymeric material as being the same as or less than that of the previous zone.

In accordance with the present application, the membrane has a throughput (in L/m$^2$), when measured using whey broth, which is greater than −11.65x+1088.5, greater than −11.65x+1188.5, or greater than −11.65x+1288.5, where x is the bubble point (in psi).

In a further embodiment, the membrane has a throughput (in L/m$^2$), when measured using EMD Soy broth, which is greater than −20.23x+1369.4, greater than −20.23x+1469.4, or greater than −20.23x+1569.4, where x is the bubble point (in psi).

When comparing the properties of filtration membranes, fluid permeability and bubble point are most often used. As used herein, "permeability" is defined as the bulk velocity of the fluid flowing through the membrane at a unit pressure difference across the porous structure, commonly measured in liter/(m$^2$·hr·psi). The most common fluids used to measure permeability are air and water.

As used herein, "bubble point" is defined as the pressure of gas that is required to displace a liquid from the largest pore of the porous structure. The sample of the material to be tested is soaked in a liquid that spontaneously fills the pores in the sample. Gas under pressure is then applied on one side of the sample. Initially, the gas does not flow through the sample because the pores in the sample are filled with the liquid. However, when the gas pressure is increased, the gas empties the largest pores of liquid at a certain level of pressure and gas begins to flow through the sample. The pressure at which the gas starts to flow through the sample is known as the bubble point pressure.

The relation between the size of a fluid-wet cylindrical pore and the air pressure required to empty it (P, the bubble pressure for that cylindrical pore) is:

$$D=4\gamma \cos \theta /P$$

where D is the diameter of the pore, θ is the contact angle, and γ is the surface tension of the wetting liquid. When measured bubble pressure can be empirically correlated to the size of real membrane pores, it provides readily obtained estimates of the sizes of real, noncylindrical pores.

The bubble point of the membrane was measured using a Capillary Flow Porometer (Model no: CFP-1200AEX) made by Porous Materials, Inc. The test liquid used for the bubble point measurements was isopropanol.

The breaking strain is defined as the ratio of the extension of the membrane to its original length at the point when the membrane is broken under stress. The breaking strain of the membranes was tested using a Zwick/Roell Z2.5 machine. Test samples with size of 1 inch by 4.5 inches were precut from left (L), center (C), and right (R) locations of membrane rolls. The left and right samples were taken from locations 1 inch away from the edge of the membrane. Test samples were loaded to the Zwick machine and then stretched under stress. The stress and strain curves were recorded until the breaking point. The reported values are the average of the test results of the L, C, and R samples. In a further embodiment of all aspects of the present application, the membrane has a breaking strain of at least 25% or at least 30%.

The higher breaking strain of the membranes is advantageous over the prior art. Previously Millipore Express® membranes with pore size ratings of 0.5 μm and Millipore Express® PLUS 0.2 μm were made for high throughput applications. However, the breaking strain for the 0.5 μm membrane is <10% and for the Millipore Express® PLUS 0.2 μm membrane it is <20%, and neither of those two membranes are pleatable.

The term "polymer" as used herein is meant to include polymeric compositions formed from one or more monomers. Representative suitable polymers for forming the porous membrane include polyolefins such as polyethylene, polypropylene, polymethylpentene, or the like; polystyrene or substituted polystyrenes; fluorinated polymers including poly(tetra fluorethylene), polyvinylidene fluoride or the like; polysulfones such as polysulfone, polyethersulfone or the like; polyesters including polyethylene terephthalate, polybutylene terephthalate or the like; polyamides including poly (hexamethylene adipamide), poly (phenylene terephthalamide) or the like; polyacrylates and polycarbonates; vinyl polymers such as poly vinyl chloride and polyacrylonitriles. Copolymers also can be employed such as copolymers of butadiene and styrene, fluorinated ethylene-propylene copolymer, ethylene-chlorotrifluoroethylene copolymer or the like.

The membrane's first, second, and third microporous zones can be formed from one or more polymers independently selected from the group consisting of PVDF, polyamides, polyimides, polyether sulphones, polysulphones, polyaryl sulphones, PVC, PET, polycarbonates, cellulose, regenerated cellulose, cellulose esters, polystyrenes, polyetherimides, acrylic polymers, methacrylic polymers, and copolymers of acrylic or methacrylic polymers.

Preferred polymers include but are not limited to PVDF, nylons such as Nylon 66, polyamides, polyimides, polyethersulphones, polysulphones, polyarylsulphones, PVC, PET, polycarbonates, cellulose, regenerated cellulose, cellulose esters such as cellulose acetate or cellulose nitrate, polystyrenes, polyetherimides, acrylic polymers, methacrylic polymers, copolymers of acrylic or methacrylic polymers, or blends of any of the above and the like.

The polymer mixes of the present application typically include at least one polymer and at least one solvent for the polymer or polymers. The mix may contain one or more components that are poor solvents or non-solvents for the polymer or polymers. Such components are sometimes called "porogens" in the art. The mixes are preferably homogeneous. They can optionally contain one or more components, which are non-solvents for the polymer. The polymer mix can either be stable over time (which is achieved by good solvent quality) or be meta-stable over time. This mix also can potentially have a lower critical solution temperature or an upper critical solution temperature. Solvents that are used include dimethyl formamide, N,N-dimethylacetamide, N-methyl pyrrolidone, tetramethylurea, acetone, or dimethylsulfoxide. A myriad of porogens have been used in the art, including formamide, various alcohols, and polyhydric compounds like water, various polyethylene glycols, and various salts, such as calcium chloride and lithium chloride.

Examples of other additives include surfactants to improve wettability, and polymers compatible with the primary membrane polymer used to modify mechanical properties of the final membrane.

Membranes can be classified as hydrophilic or hydrophobic. When the hydrophilic structures are brought into contact with water, they will spontaneously wet, —i.e. water will displace the air from the pores of the structure without the application of any external force. On the other hand, a positive pressure is required for water to enter the pores of hydrophobic structures to displace the air.

Examples of surfactants used in the creation of microporous membranes can be found in U.S. Pat. No. 4,290,987 to Soehngen, et al., U.S. Pat. No. 4,298,666 to Taskier, and 4,501,793 to Sarada, which are hereby incorporated by reference in their entirety. Surfactants, as commonly known in the art, can be coated on to membranes. One such example of this is disclosed in U.S. Pat. No. 3,853,601 to Taskier, which is hereby incorporated by reference in its entirety. The disclosed polyolefinic microporous films, such as polypropylene microporous films, are rendered hydrophilic by treatment with a silicon glycol copolymeric surfactant. The microporous film may be impregnated with a combination of a silicon glycol copolymeric surfactant and a cationic imidazoline tertiary amine. The surfactants are applied to the polyolefinic microporous films by contacting the film with a dilute solution of from about 1 to 10% by weight of the surfactant and/or surfactants in an organic solvent such as acetone, methanol, ethanol, or isopropyl in order to produce an "add-on" of the surfactant to the microporous film of from about 2 to about 20 percent by weight, based on the weight of the uncoated microporous film. Hydrophilic microporous polyolefinic films produced by this method are described as being rapidly wettable and useful as battery separators.

U.S. Pat. No. 4,501,793 to Sarada, which is hereby incorporated by reference in its entirety, discloses the use of alkylphenoxy poly(ethyleneoxy) ethanol surfactants. The surfactants used possess an HLB (Hydrophilic Lipophilic Balance) of from about 10 to 15. Such surfactants are well known to those skilled in the art, and are readily commercially available. Suitable surfactants include, for example, the 500 and 600 series compounds sold under the tradename Igepal by the GAF Corporation, such as Igepal RC-520, RC-620, RC-630, CO-520, CO-530, CO-610, CO-630, CO-660, CO-720, CA-520, CA-620 and CA-630.

The hydrophilic microporous membranes can be prepared by impregnating the normally hydrophobic polyolefinic microporous substrate membrane with a solution containing one or more of the aforementioned alkylphenoxy poly(ethyleneoxy) ethanol compounds in a solvent mixture comprising from about 55 to 65 volume percent of methanol or acetone and from about 35 to 45 volume percent water. Preferably, the solvent system comprises about 60 volume percent of methanol or acetone (particularly methanol) and about 40 volume percent water. A preferred procedure includes immersing the microporous substrate material in the surfactant solution for an amount of time sufficient to produce the desired improvement in the hydrophilic properties of the polyolefinic microporous substrate. If desired, the surfactant solution may be employed in the form of an ultrasonic bath, although this procedure does not appear to be critical to the preparation of the hydrophilic materials. It has been discovered that the use of the aforementioned solvent system achieves a more intimate penetration of the porous structure of the microporous substrate material by the alkylphenoxy poly(ethyleneoxy) ethanol surfactant than obtainable by other solvent systems which have been employed for treating microporous materials.

A hydrophilic membrane of the present application can be made by blending a hydrophilic polymer or polymers into mix. Examples of hydrophilic polymers are polyacrylic acid, polyvinylalcohol, polyvinyl acetate, polyvinylpyrrolidone, polyethyleneglycol, polyvinylpyridine, polyethyleneimine, polyoxazoline, and the like. Hydrophilic membranes can also be made by further surface modification as stated in U.S. Pat. No. 4,944,879 to Steuck, which is hereby incorporated by reference in its entirety. In this case, no hydrophilic polymer will be added into the casting mix and a hydrophobic membrane will be made first.

In another embodiment, the membrane's first, second, and/or third microporous zones can be hydrophilic. The first, second, and/or third microporous zones can include a hydrophilic polymer independently selected from the group consisting of polyacrylic acid, polyvinyl alcohol, polyvinylacetate, polyvinylpyrrolidone, polyethyleneglycol, polyvinylpyridine, polyethyleneimine, and polyoxazoline. In specific embodiments of the present application, the hydrophilic polymer includes poly (2-ethyl-2-oxazoline). More specifically, the membrane's the first, second, and/or third microporous zones may include polyether sulfone, and poly (2-ethyl-2-oxazoline). The hydrophilic polymer may be cross-linked, which can be accomplished with treatment by an electron beam (e-Beam). In an exemplary embodiment of the present application, the hydrophilic polymer is cross-linked by electron beam with a dose of from about 20 to 150 kGy.

Additionally, the membrane can include a hydrophilic coating over the membrane. To surface modify a hydrophobic membrane with a hydrophilic polymer coating, the coating polymer can be directly coated onto the membrane or coated on a membrane which previously has been coated with an intermediate polymer without the use of a chemical polymerization initiator. In the absence of an intermediate polymer, a crosslinking agent is added to the monomer being coated onto the membrane. When the intermediate polymer is employed, it functions as a crosslinking agent, and, in this case, a separate crosslinking agent need not be included.

When an intermediate coating polymer is utilized, it functions to promote coating of the porous membrane with the cross-linked monomer. A solution of the intermediate polymer is applied to the porous polymer membrane. The concentration of the intermediate polymer in solution is such as to evenly coat the porous membrane without blocking the pores and is usually between about 1 and 20% by weight of the solution. Thereafter, the intermediate polymer is cross-linked by being exposed to an electron beam; or in the alternative, the polymerizable monomer can be coated on the porous polymer membrane and both the intermediate polymer and monomer can be cross-linked with an electron beam. Suitable intermediate polymers include polybutadiene, polyvinyl chloride, atactic polypropylene, thermoplastic polyurethane, polyamides (Nylon 66), polyisobutylene, and the like, which exhibit the ability to graft to the porous membrane substrate when exposed to electron beam energy.

The polymerization and cross-linking of the polymerizable monomer to the porous membrane must be carried out so that the entire surface of the porous membrane, including the inner surfaces of the pores, are coated entirely with a monomer. Therefore, in a first step, the porous membrane is washed with a solvent composition that does not swell or dissolve the porous membrane and which wets the surfaces of the pores such as a mixture of water and an organic solvent. Suitable water-solvent compositions for this purpose include methanol/water, ethanol/water, acetone/water, tetrahydrofuran/water, or the like. The purpose of this wetting step is to assure that the monomer composition subsequently contacted with the porous membrane wets the entire surface of the porous membrane. This preliminary wetting step can be eliminated when the reagent bath itself functions to wet the entire surface of the porous membrane. This can be achieved when the reagent bath contains a high concentration of organic solvent, for example 15% by weight or higher.

The particular solvent employed for the polymerizable monomer, will depend upon the particular monomer employed and upon the particular polymer utilized to form the porous membrane. It is necessary that the monomer dissolve in the solvent and that the solvent does not attack the porous membrane. Thus, the particular solvent system used will depend upon the monomer and porous membranes employed. Representative suitable solvents include water or organic solvents such as alcohols, esters, acetone or compatible aqueous mixtures thereof.

Generally, the polymerizable monomer to be coated on a membrane is present in the reactant solution at a concentration between about 0.1% and about 20%, preferably between about 0.5% and about 1% based upon the weight of the reactant solution. When a cross-linking agent other than an intermediate polymer is utilized, the crosslinking agent is present in a concentration of between about 0.1% and about 20% based upon the weight of the monomer.

The following procedure describes a general method to produce a modified membrane surface. The membrane to be treated is wet in methanol, rinsed in water, and soaked in the aqueous monomer/crosslinker solution for several minutes to assure complete exchange. If the monomer/crosslinker solution is capable of wetting the membrane directly, the prewet exchange steps are not necessary. The wet membrane is sandwiched between sheets of polyethylene and gently pressed with a rubber roller to achieve a uniform loading of monomer/crosslinker solution and then exposed in e-Beam. The pressed membrane is removed from the polyester sandwich and taped to a new sheet of polyester, which then is in turn taped to the polyester carrier belt of a pilot coater/laminator and electron beam processor. The electron beam processor is set to deliver the desired dose and maximum current necessary for the crosslinking. After the desired dose has been delivered, the treated membrane is rinsed in water and/or methanol to remove unreacted and oligomeric materials. The membrane is then dried and tested for rewet, flow, and other properties.

Another aspect of the present application relates to a multizone, unsupported, microporous, high throughput filtration membrane where the membrane has a first microporous zone which is symmetric or asymmetric, a second microporous zone which is symmetric or asymmetric, and a third microporous zone which is asymmetric. The third microporous zone is positioned between the first and second microporous zones, and the first, second, and third microporous zones are integral with one another. Additionally, the first, second, and/or third microporous zones comprise a blend of a first polymer selected from the group consisting of PVDF, polyamides, polyimides, polyether sulphones, polysulphones, polyaryl sulphones, PVC, PET, polycarbonates, cellulose, regenerated cellulose, cellulose esters, polystyrenes, polyetherimides, acrylic polymers, methacrylic polymers, and copolymers of acrylic or methacrylic polymers, and a second polymer wherein the second polymer is selected from one or more hydrophilic polymers from the group consisting of polyacrylic acid, polyvinylalcohol, polyvinyl acetate, polyvinylpyrrolidone, polyethyleneglycol, polyvinylpyridine, polyethyleneimine, and polyoxazoline. The membrane has a breaking strain of at least 20%, and has a throughput (in $L/m^2$), when measured using whey broth, which is greater than $-11.65x+1088.5$, where x is the bubble point (in psi), or a throughput, when using EMD Soy broth, which is greater than $-20.23x+1369.4$, where x is the bubble point (in psi).

In another embodiment, the first polymer is PES and the second polymer is poly (2-ethyl-2-oxazoline). Additionally, the membrane can be cross-linked. In a more specific embodiment of the present application, the first polymer is PES, the second polymer is a polyoxazoline, and the membrane is cross-linked by electron beam. The membrane may be cross-linked by electron beam with a dose of from about 20 to 150 kGy.

In a further embodiment of the present application, the membrane is capable of being pleated without degradation of membrane retentive performance. In a more specific example of all aspects of the present application, the membrane is pleated.

As used herein, the term "pleat" or "pleated" is intended to include all such cross-sectional shapes. Relative to occupied volume, the pleated structure presents to an incoming fluid process flow more surface area than that which would be presented by use of flat sheet. This is of particular advantage in consideration of the desire to maximize device throughput.

The pleats of the membrane can be configured in a corrugated shape or spirally positioned and can have a loop-shaped cross-section or a folded cross-section, such as a W-shaped or M-shaped cross-section. The pleated membrane is typically wrapped along a vertical axis and the ends of the pleated membrane are sealed to each other to form a tubular structure or a filter tube. In another embodiment, the pleated membrane is sealed as a flat corrugated filter in a frame sealed to its outer peripheral edges. In all embodiments, the pleated membrane is designed such that liquid or gas must pass through the membrane in order to pass downstream of the membrane.

The retentive properties of the membrane can be tested using the ASTM F838-15 Bacterial Retention Testing method. In this testing, worst-case processing conditions are used to determine the ability of a sterilizing-grade filter to retain a minimum challenge of $10^7$ cells of *Brevundimonas diminuta* (*B. diminuta*) per $cm^2$ of filter area. Size controls are run with each test to prove that the test organism is the appropriate size. For devices made with a 0.2 μm pore size rated membrane, it is important that the device is fully retentive when challenged with a *B. Diminuta* solution. If the membrane is weak enough, cracks can be formed during the membrane pleating process. Consequently, a high diffusion rate will be observed in the device and the device will not be fully retentive. Because of the formation of cracks from pleating, the probability of microorganisms such as *B. diminuta* passing through the cracks increases, thus causing the reduction in retention, the so-called "degradation" of the membrane retentive properties.

A second aspect of the present application relates to a filtration cartridge including a housing, and a membrane of the present application positioned within the housing. The filtration cartridge can include a membrane of the present application in the form of a filter tube. In one embodiment of the present application, the membrane of the filter cartridge is pleated. In another embodiment, the filter is spiral wound in one or more layers, with or without spacers between them. Furthermore, the cartridge can contain greater than 0.11 $m^2$ of effective membrane area per inch of housing height.

Figure 3:
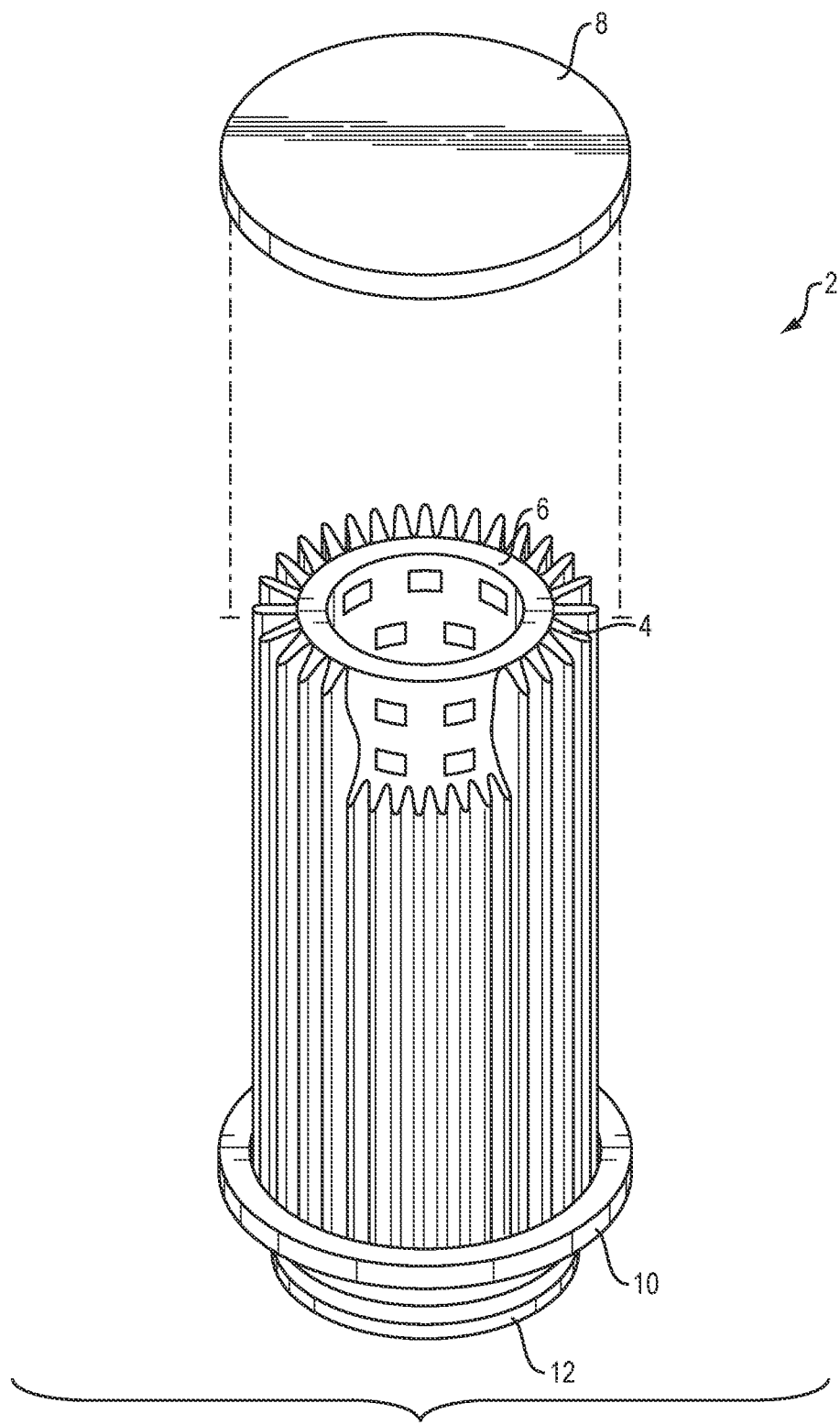
FIG. 3 is a perspective view in partial cross section of an exemplary filter cartridge of the present application.

One example of a filter cartridge of the present application is shown in FIG. 3. Filter cartridge 2 of FIG. 3 includes pleated high throughput membrane of the present application 4, which surrounds a porous hollow core 6 and is provided with a sealing cap 8 and a second cap 10 having an outlet 12. Optionally, an outer porous protective cage (not shown) is spaced from and surrounds the outer surface of the membrane. Preferably the cage is sealed to sealing cap 8 and second cap 10 to form an integral cartridge filter. The cage if used, maintains the membrane in a relatively fixed tubular conformation. The cage can be made of rigid materials and have uniformly dispersed holes to allow the inward flow of fluid from regions peripheral to the pleated filter tube, through the membrane, into core 6, and then ultimately out of the second end cap 10 via the outlet 12.

For further details regarding the construction and functions of a replaceable filter cartridge are provided by U.S. Pat. No. 5,736,044, to Proulx, et al. The pleated filter element can be utilized alone or with a pre-filter. The pre-filter may be positioned within the housing adjacent the fluid inlet or it may be applied to the cartridge adjacent the outer surface of the membrane.

Filter cartridges typically include a porous filtration element located within a structural housing. In such filters, unfiltered fluid enters the housing through an inlet port and passes through the filtration element, which removes contaminants or other impurities from the fluid. The filtered fluid is discharged through an outlet port. Filter cartridges include so-called "quick change" cartridges that typically have the inlet and outlet combined in a single port at one end of the housing and in-line cartridges in which the inlet and outlet ports are located at opposite ends of the housing. Because the fluid flow is often pressurized, these ports are typically sealed, such as with an O-ring or the like. It is therefore desirable to provide small ports because larger openings are more difficult to seal (the larger the seal, the larger the force it is subjected to for a given pressure).

The housing may be constructed as one-piece, or as two or more components that are structurally attached together into an assembly. The use of a one-piece housing enables a cost reduction relative to a multi-piece assembly. A polymeric one-piece housing can be fabricated by any suitable process including blow molding or injection molding with gas or water assist. Blow molding is generally faster and less expensive than injection molding. Blow molding also stretches and aligns the polymer chains and produces stronger and tougher resultant material properties as compared to injection molding. Either process can produce a hollow container with an interior that has a larger dimension than the throat or port sizes desired at the connection end, much like a plastic bottle. Alternatively, the housing can be metallic and fabricated by a casting method or spin forming. And while a one-piece construction provides cost benefits, the housing could alternatively be produced as a two (or more) piece assembly of parts formed by injection molding or casting.

Figure 4:
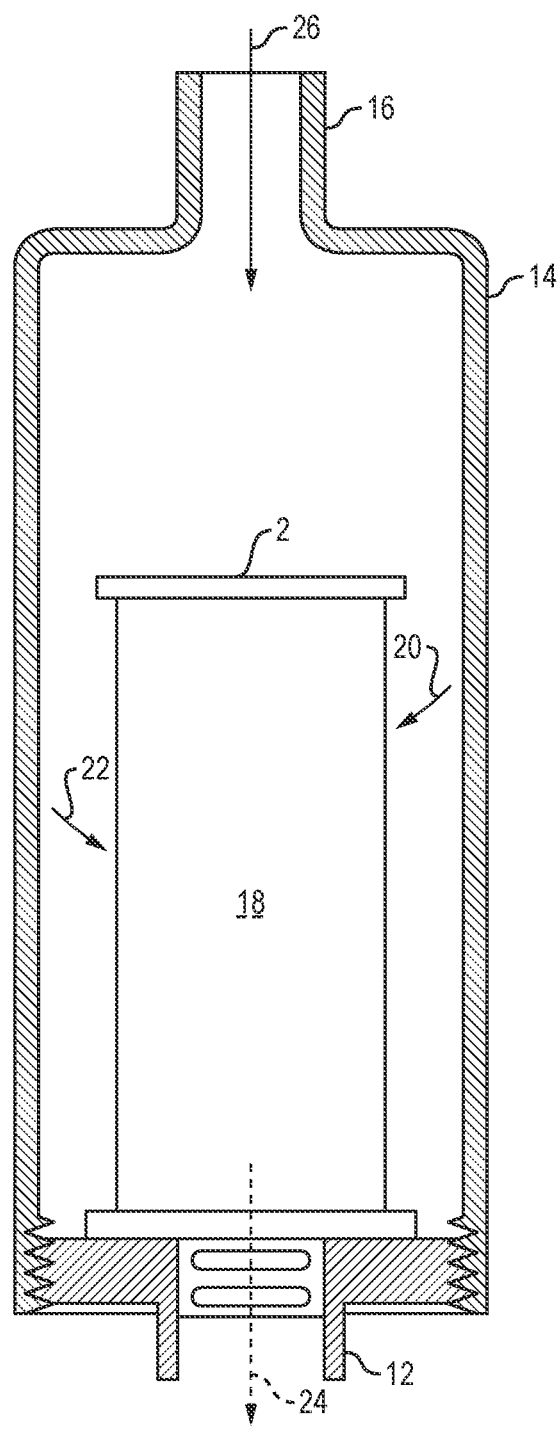
FIG. 4 is a perspective view in cross section of an exemplary filter cartridge of the present application positioned within a housing during use.

The filter tube, preferably pleated, is composed of at least one layer of the high throughput membrane of the present application. Preferably, the membrane is oriented such that fluid introduced into said housing through the fluid inlet commences passage through the asymmetric membrane through its open-side. FIG. 4 shows one such design. The cartridge 2 is positioned in housing 14. A fluid to be filtered, be it liquid or gas, enters the first or inlet port 16 into the interior of housing 14 as indicated by arrow 26. The fluid passes through the outer surface 18 of the cartridge 2 as indicated by arrows 20 and 22 to the core (not shown) and out the second port 12 or outlet of housing 14 as indicated by arrow 24. If desired the flow of fluid may be the opposite of that described above, with second port 12 acting as the inlet and first port 16, acting as the outlet. Fluid can flow from second port 12, through the core and the membrane (not shown), past outer surface 18 of cartridge 2 to the interior of the housing 14 and out through the first port 16.

A further aspect of the present application relates to a filtration cartridge including a housing, and a pleated membrane positioned within the housing, where the membrane has a first microporous zone which is symmetric or asymmetric, a second microporous zone which is symmetric or asymmetric, and a third microporous zone which is asymmetric. The third microporous zone is positioned between the first and second microporous zones with the first, second, and third microporous zones being integral with one another. The first, second, and/or third microporous zones include a blend of a first polymer selected from the group consisting of PVDF, polyamides, polyimides, polyether sulphones, polysulphones, polyaryl sulphones, PVC, PET, polycarbonates, cellulose, regenerated cellulose, cellulose esters, polystyrenes, polyetherimides, acrylic polymers, methacrylic polymers, and copolymers of acrylic or methacrylic polymers, and a second polymer wherein the second polymer is selected from one or more hydrophilic polymers from the group consisting of polyacrylic acid, polyvinyl alcohol, polyvinylacetate, polyvinylpyrrolidone, polyethyleneglycol, polyvinylpyridine, polyethyleneimine, and polyoxazoline. The membrane has a breaking strain of at least 20%, and has a throughput (in L/m$^2$), when measured using whey broth, which is greater than $-11.65x+1088.5$, where x is the bubble point (in psi) or a throughput, when using EMD Soy broth, which is greater than $-20.23x+1369.4$, where x is the bubble point (in psi); and where the housing contains greater than 0.11 m$^2$ of effective membrane area per inch of housing height.

A further aspect of the present application relates to the process of forming a multizone, microporous, high throughput filtration membrane with a breaking strain of at least 20%. This process includes providing solutions of a polymer and a solvent for the polymer, and simultaneously or sequentially casting the solutions as 3 separate zones onto a support to form a multizone liquid sheet, effecting a phase separation of the 3 separate zones of solutions, and separating the multizone, microporous, high throughput filtration membrane from the support. The membrane comprises a first microporous zone which is symmetric or asymmetric, a second microporous zone which is symmetric or asymmetric, and a third microporous zone which is asymmetric, where the third microporous zone is positioned between the first and second microporous zones. The first, second, and third microporous zones are integral with one another, and the membrane has a throughput (in L/m$^2$), when measured using whey broth, which is greater than $-11.65x+1088.5$, where x is the bubble point (in psi) or a throughput, when using EMD Soy broth, which is greater than $-20.23x+1369.4$, where x is the bubble point (in psi).

In one embodiment of the process for forming the high throughput multizone membrane, the solutions include at least one polymer and at least one solvent for the polymer. The solutions can have an upper critical solution temperature, or a lower critical solution temperature. Additionally, the solutions can further include one or more porogens, such as formamide, alcohols, polyhydric compounds, water, polyethylene glycol, calcium chloride, and lithium chloride. The process of forming the high throughput multizone membrane can also include coating a hydrophilic substrate on the membrane.

The casting of the high throughput multizone membrane can be carried out sequentially. Furthermore, the casting can be done simultaneously, such as by co-casting.

In another embodiment, the membrane formation process includes phase separation carried out by heating the solutions above their lower critical solution temperature. The phase separation can also be carried out by vapor induced phase separation.

In forming multizone membranes, one can form the different mixes for the different zones by varying the concentration of polymer, solvent or non-solvent, as well as the viscosity, additives or treatments of the solutions or combinations of any of these to create the desired multizone structure.

The selection of a solvent to provide a stable homogeneous solution for casting in the formation of membranes involves basic principles of polymer solubility. Polymer solvents may be categorized as good solvents, nonsolvents, and poor solvents. Good solvents are those in which the interactions (forces) between the polymer molecules and solvent molecules are greater than the forces of attraction between one polymer molecule and another polymer molecule. The reverse is true for nonsolvents. Poor solvents are those in which the interactions between the polymer and solvent are equal to the forces of attraction between one polymer and another polymer molecule.

Generally, one can form the zones of a multi-zone structure from the same polymer and solvent, varying the concentration of components in the mix, viscosity, additives and treatment (before, during, or after formation) or one can use different polymers for the different zones. When using different polymers, one must select polymers that are compatible. Additionally, the solvents and phase separation materials should be the same if possible or at least compatible so that they do not adversely affect the other zone(s).

There are several processes for the preparation of porous polymeric structures. Most common processes are based on phase separation of a polymer solution. In such processes, the composition or temperature of a polymer solution is changed in such a way that it becomes thermodynamically unstable and separates into two phases. One of the phases, containing most of the solvent components, is then removed and the other phase, containing most of the polymer, becomes the porous structure. The types of phase separation processes are usually classified into three categories: 1) vapor-induced phase separation (VIPS), also called "dry casting" or "air casting", 2) liquid-induced phase separation (LIPS), mostly referred to as "immersion casting" or "wet casting", and 3) thermally induced phase separation (TIPS), frequently called "melt casting".

VIPS and LIPS processes rely on mass transfer between the components of the cast polymer solution, or mixes, and the precipitant medium present in vapor or liquid state, respectively. TIPS is controlled by temperature change of the polymer solution. The VIPS process has an inherent disadvantage of low mass transfer rate so that the required residence time in the casting machine is long, resulting in a trade-off between long machines with high capital investment or low process rates. The LIPS process is run at relatively higher rates, since the mass transfer between the polymer solution and a liquid precipitant is higher. While this is an advantage in LIPS processes used to make ultrafiltration and reverse osmosis membranes that require high mass transfer rates to create small pore sizes, it is a complication in processes for making microporous structures which typically require moderate mass transfer rates to allow sufficient growth of the dilute phase leading to higher pore sizes in the microporous range 0.05-10 micrometers. In order to make microporous structures using the LIPS process, several ways of overcoming this complication have been devised in the prior art. Using high content of an organic solvent as described in U.S. Pat. No. 4,203,847 to Grandine and 4,340,479 to Pall, which are hereby incorporated by reference in their entirety, or a straight organic solvent in the immersion bath is one of the common methods. This principle was well analyzed by Wijmans et al., J. Membr. Sci., 14, 263 (1983), which is hereby incorporated by reference in its entirety. The disadvantage of this technique is the use of large volumes of combustible organic liquid requiring an explosion-proof manufacturing facility and the high cost of solvent disposal.

As taught in U.S. Pat. No. 5,444,097 to Tkacik, which is hereby incorporated by reference in its entirety, the membrane is made from a polymeric mix exhibiting a lower critical solution temperature ("LCST") which was measured by cloud point. Heating the mix above the LCST causes phase separation. This phase separation step is incorporated in the process of present application for the membrane pore size control. The vapor induced phase separation step was incorporated in the present application as well. Dew point and vapor temperature will impact membrane pore forming process and thus pore size can be controlled accordingly.

The process of the present application utilizing a LCST process starts with preparing a homogeneous mix of at least one polymer in a solvent system, said solvent system consisting of at least one component which is a solvent for the polymer, where the homogeneous solution exhibits a lower critical solution temperature. The homogeneous mix may optionally contain one or more components which are non-solvents for said polymer. The mix solution can be prepared by conventional means, mixing together the polymer with the components of the solvent system. Next, the polymeric mix is formed into the desired shape. The shaped mix is then heated until phase separation occurs, marked by cloudiness of the solution. The components of the solvent system are thereafter removed by methods such as evaporation or extraction and the like. The conditions of the removal process may further affect the later stages of phase separation and influence the properties of the polymeric porous structure. A preferred method for removing the components of the solvent system involves immersing the shaped phase-separated polymeric mix in one or more liquid baths comprising at least one non-solvent for the polymer, the non-solvent being miscible with at least one component of the solvent system. The porous polymeric structure may then be optionally subjected to additional extraction or drying.

As taught in U.S. Pat. No. 7,842,214 to Romdhane, et al., which is hereby incorporated by reference in its entirety, vapor induced phase separation (i.e., air casting) generally includes a coagulant (e.g., water vapor) for inducing a phase inversion. The coagulant can be introduced to the polymeric material of the membrane as a vapor. A high concentration of vapor may condense and reduce the thermodynamic stability of the polymeric material dissolved in a solvent. Analogous to a liquid induced phase separation, polymer rich and polymer poor regions are formed from the vapor induced phase inversion, resulting in the formation of a microstructure. Examples of coagulants for vapor induced phase separation include water, alcohols, amides and combinations thereof.

Contact of the polymer and coagulant vapor at a surface, and the diffusion of a portion of the coagulant into the polymer solution may cause the polymeric material to become thermodynamically unstable. The polymeric material can precipitate from the solvent of the solution forming a microstructure. During phase inversion, regions of the polymer solution zones are rich in polymeric material forming a structure, and some regions are poor in polymeric material forming pores. Membranes may be further subjected to solvent removal and subsequent drying after development of the microstructures.

After the polymer mixes are made, they are applied to a moving carrier. For an unsupported membrane, which does not have a web attached to the final membrane, the carrier is usually a plastic film, such as polyethylene terephthalate, or a polyethylene coated paper, or similar smooth continuous web that can be easily removed from the formed membrane.

In one embodiment of the present application, the membrane is created through a process of slot co-casting. "Co-casting" means that the individual zones are cast essentially simultaneously with each other with substantially no time interval between one cast zone and the next cast zone. Co-casting is an important aspect of the present application, because it allows for formation of controlled pore size regions at the junctions of zones. In other casting techniques known in the prior art, a well-defined demarcation line is formed between the sequentially cast zones. A drastic change in pore size going from a more open to a tighter structure can lead to undesirable fast accumulation of particles at the interface and/or the formation of a skin zone at the demarcation point and, consequently, a drastic flux decline. Possibly due to partial mixing of adjacent co-cast lacquers or due to high shear forces at the interface between two adjacent co-cast lacquers, a sharp interface can be replaced by a more subtle change in pore size between two adjacent zones. Such an interfacial zone is beneficial for the retentive behavior of the overall structure of the membrane. At the same time, it allows the formation of microporous structure with no discernable demarcation line in the structure.

Application of the polymer mixes can be done by any standard method. The objective is to coat a first mix solution onto the carrier and a second mix solution upon the first, and a third mix solution upon the second. A preferred method is co-casting, which is described in detail in U.S. Pat. No. 8,123,992 to Kools, which is hereby incorporated by reference in its entirety. Co-casting can be done with a triple slot die over roll apparatus, a pressurized tri-slot coating bead, or any other pre or postmetering coating device as is known in the industry. Co-casting generally allows for formation of controlled pore size regions at the junctions of zones, however, even with the co-cast technique one can, if desired, form a sharp or well-defined demarcation line between zones with the proper selection of formulations and application methodologies.

Figure 5:
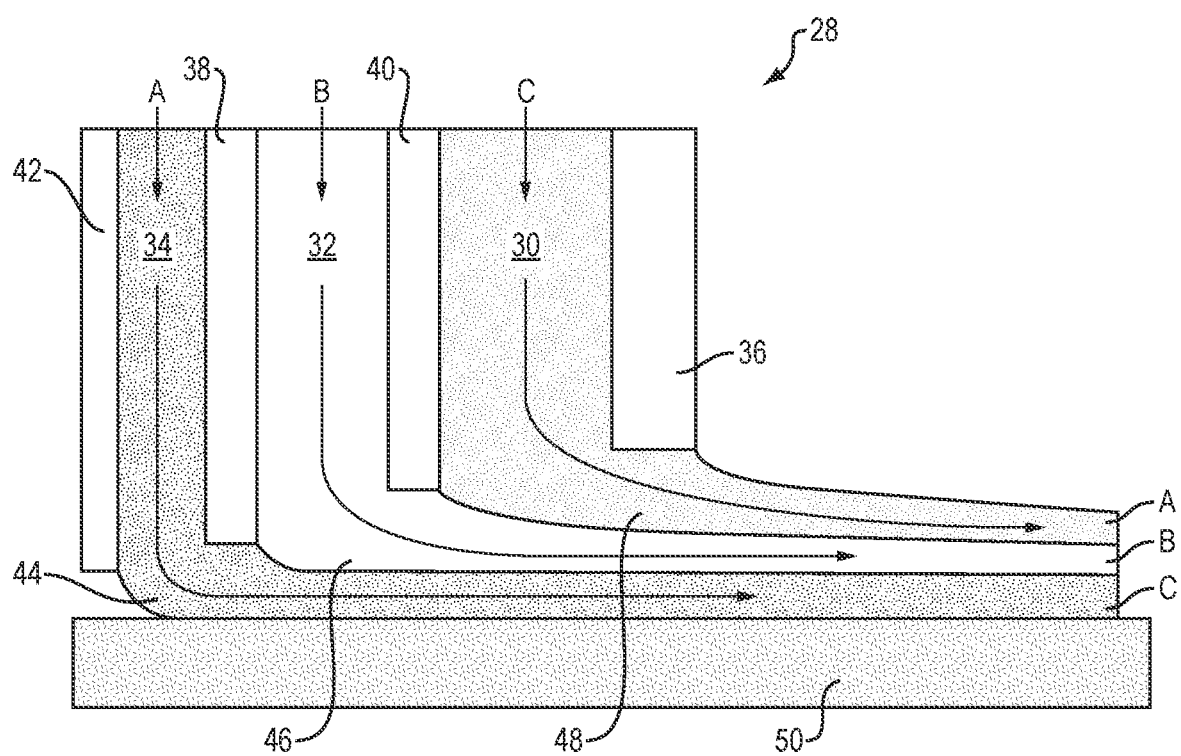
FIG. 5 is a side view of an apparatus useful in effecting the process of making the high throughput multizone membrane of the present application.

FIG. 5 illustrates a multiple zone forming apparatus 28 for casting multizone membranes. As shown, apparatus 28 is designed to produce a three-zone liquid film and has three chambers 30, 32 and 34, containing solutions A, B, and C, one for each zone, to be cast. If desired, additional chambers may be added to form additional co-cast zones. The apparatus comprises front wall 36, and back wall 42, with separating walls 38 and 40 between the front and back walls. The separating walls define the volumes of the three chambers. Two side walls complete the apparatus. In operation, the apparatus is fastened onto a typical membrane casting machine, and a support web 50 is moved or passed under the stationary apparatus and the three solutions are dispensed through gaps or outlets 44, 46, and 48. The thickness of the zones is controlled by the distance (gap) set between, the moving web and the outlet, illustrated by gap settings 44, 46, and 48. The final liquid layer thickness is a function of gap distance, solution viscosities, and web speed. The back wall of the apparatus usually is held a small distance above the support to prevent wrinkling or marring the support. Back wall gap, support speed, and solution viscosity are adjusted in practice to prevent solution from leaking out through the back wall gap. The apparatus can be fitted with heating or cooling means for each chamber separately, or for the apparatus as a whole, if necessitated by the solution characteristics, or to further control final membrane properties.

A slot die consists of an enclosed reservoir with an exit slot having a smaller cross-section. An extruder or positive displacement pump, or in some cases a pressurized vessel feeds the coating into the reservoir at a uniform rate, and all of the fluid that goes into the die is forced out from a reservoir through a slot by pressure, and transferred to a moving carrier web. The slot is positioned perpendicular to the moving carrier web. Multiple zone coatings require a die with individual reservoirs, and associated feed method, and exit slots for each zone.

The membranes of the present application can be produced using a premetered coating process. Premetered coatings are those in which the exact amount of coating solution to be deposited is led to the coating head. The height of the zones is set by the deposition rather than by some post application means such as a doctor blade which sets the thickness of the structure after metering of the zones (commonly referred to as "post metering process"). The premetered term is applied to die coating, slide and curtain coating among other methods of forming the structure.

After the zones are coated onto the moving carrier, the nascent membrane is immediately exposed to the environment of a controlled air chamber. Thermal induced phase separation could start by controlled drum temperature and moisture induced phase separation could start due to moisture absorbed from the air chamber. Thereafter, the nascent membrane is immersed into a liquid that is a nonsolvent for the polymer, and miscible with the solvent and porogens. This will cause nonsolvent induced phase separation and, finally, the formation of a porous membrane. One example of a liquid that can be used as a non-solvent for the nascent membrane is water.

The formed membrane is then usually separated from the carrier and washed to remove residual solvent and other material. The membrane can then be dried. Water can be used to wash the membrane, and membrane can be dried with vacuum drum drier.

In the coagulation of a multizone liquid sheet, coagulation occurs from the liquid film surface that first contacts the coagulation bath and then through the subsequent zones of the multizone liquid sheet. Each zone dilutes and changes the coagulant as the coagulant diffuses through the zones. Such changes to the nature of the coagulant affect the membrane formation of each zone and of the final multizone membrane. Zone thickness, composition, and location of each zone relative to the other zones will affect membrane structure and properties. Each zone forms differently than it would if it were to be made from a single zone solution or from laminates of single zones.

In another embodiment, the zones are sequentially cast successively on to the prior cast. In sequential casting, the solutions comprising the polymers are typically cast into thin films, one on top of the other, followed by quenching in a non-solvent for the polymers. The first solution is spread in a zone (bottom zone) onto a support (such as a nonporous support), and the second solution is spread in a zone (upper zone) onto the first solution, and so on. The membrane can be later separated from the support after quenching; however, the support (porous or non-porous) can be incorporated into the final structure if desired.

The membranes can be cast manually (e.g., poured, cast, or spread by hand onto a casting surface and quench liquid applied onto the surface) or automatically (e.g., poured or otherwise cast onto a moving bed). There should be a time interval between the casting of the solutions. Preferably, the time interval is about 2 seconds or more. For example, the time interval can be in the range of from about 2 seconds to about 35 seconds, or about 2 seconds to about 10 seconds.

A variety of devices known in the art can be used for casting. Suitable devices include, for example, mechanical spreaders, that comprise spreading knives, doctor blades, or spray/pressurized systems. One example of a spreading device is an extrusion die or slot coater, comprising a casting chamber into which the casting formulation (solution comprising a polymer) can be introduced and forced out under pressure through a narrow slot.

The support with the cast solutions thereon is then immersed in a quenching bath to effect phase separation of the polymer solutions. In the quenching bath, precipitation or coagulation occurs from the liquid film surface that first contacts the bath and then through the subsequent zone. After formation, the membrane is typically washed (e.g., in deionized water) to remove residual solvent), and dried.

Another aspect of the present application relates to an unsupported, microporous, high throughput filtration membrane with a breaking strain of at least 20%, and a bubble point (in psi) of from about 15 to 50. The membrane has a throughput (in $L/m^2$), when measured using whey broth, which is greater than $-11.65x+1088.5$, where x is the bubble point (in psi), or a throughput, when using EMD Soy broth, which is greater than $-20.23x+1369.4$, where x is the bubble point (in psi). This aspect of the present application can be carried out with the features discussed above with respect to other high throughput filtration membrane embodiments of the present application.

A further aspect of the present application relates to a multizone, unsupported, microporous, high throughput filtration membrane having a bubble point (in psi) of from about 15 to 50, and a breaking strain of at least 20%. The membrane includes a first microporous zone which is symmetric, a second microporous zone which is asymmetric, and a third microporous zone which is asymmetric. The third microporous zone is positioned between the first and second microporous zones, with the first, second, and third microporous zones being integral with one another. The membrane has a throughput (in $L/m^2$), when measured using whey broth, which is greater than $-11.65x+1088.5$, where x is the bubble point (in psi), or a throughput, when using EMD Soy broth, which is greater than $-20.23x+1369.4$, where x is the bubble point (in psi).

An additional aspect of the present application relates to a multizone, unsupported, microporous, high throughput filtration membrane having a bubble point (in psi) of from about 15 to 50, and a breaking strain of at least 20%. The membrane includes a first microporous zone which is symmetric, a second microporous zone which is symmetric and a third microporous zone which is asymmetric. The third microporous zone is positioned between the first and second microporous zones, with the first, second, and third microporous zones being integral with one another. The membrane has a throughput (in $L/m^2$), when measured using whey broth, which is greater than $-11.65x+1088.5$, where x is the bubble point (in psi), or a throughput, when using EMD Soy broth, which is greater than $-20.23x+1369.4$, where x is the bubble point (in psi).

Another aspect of the present application relates to a multizone, unsupported, microporous, high throughput filtration membrane having a bubble point (in psi) of from about 15 to 50, and a breaking strain of at least 20%. The membrane includes a first microporous zone which is asymmetric, a second microporous zone which is symmetric and a third microporous zone which is asymmetric. The third microporous zone is positioned between the first and second microporous zones, with the first, second, and third microporous zones being integral with one another. The membrane has a throughput (in $L/m^2$), when measured using whey broth, which is greater than $-11.65x+1088.5$, where x is the bubble point (in psi), or a throughput, when using EMD Soy broth, which is greater than $-20.23x+1369.4$, where x is the bubble point (in psi).

A further aspect of the present application relates to a multizone, unsupported, microporous, high throughput filtration membrane having a bubble point (in psi) of from about 15 to 50, and a breaking strain of at least 20%. The membrane includes a first microporous zone which is asymmetric, a second microporous zone which is asymmetric, and a third microporous zone which is asymmetric. The third microporous zone is positioned between the first and second microporous zones, with the first, second, and third microporous zones being integral with one another. The membrane has a throughput (in $L/m^2$), when measured using whey broth, which is greater than $-11.65x+1088.5$, where x is the bubble point (in psi), or a throughput, when using EMD Soy broth, which is greater than $-20.23x+1369.4$, where x is the bubble point (in psi).

Another aspect of the present application relates to an unsupported, microporous, high throughput filtration membrane with a breaking strain of at least 20%, and a bubble point (in psi) of from about 15 to 50. The membrane has a throughput (in $L/m^2$), when measured using whey broth, which is greater than $-11.65x+1088.5$, where x is the bubble point (in psi), or a throughput, when using EMD Soy broth, which is greater than $-20.23x+1369.4$, where x is the bubble point (in psi).

A final aspect of the present application relates to an unsupported, microporous, high throughput filtration membrane with a breaking strain of at least 20%, and a bubble point (in psi) of from about 15 to 50. The membrane has a throughput (in $L/m^2$), when measured using whey broth, which is greater than $-11.65x+1188.5$, where x is the bubble point (in psi), or a throughput, when using EMD Soy broth, which is greater than $-20.23x+1469.4$, where x is the bubble point (in psi).

Preferences and options for a given aspect, feature, embodiment, or parameter of the technology described herein should, unless the context indicates otherwise, be regarded as having been disclosed in combination with any and all preferences and options for all other aspects, features, embodiments, and parameters of the technology.

The following Examples are presented to illustrate various aspects of the present application, but are not intended to limit the scope of the claimed invention.

EXAMPLES

Materials and Methods

Membrane performance including permeability, bubble point, thickness and breaking strain was tested after the membrane casting process was completed. Permeability was calculated by measuring the flow of water through a 47 mm membrane disk under vacuum. Membrane bubble point was tested by using isopropanol in a bubble tester. The two challenge streams chosen for membrane throughput testing include EMD Soy and Whey, and OptiScale® 25 devices were used for those tests. The detailed throughput testing procedure was described by Sal Giglia et al. in "Scaling Considerations to Maximize the High-Area Advantage", *Bioprocess International*, 15(5): 42-45 (2017), which is hereby incorporated by reference in its entirety.

Bubble Point Testing

A 25 mm membrane disk was die cut and isopropanol was used as wetting agent for the membrane bubble point test. The test was done using a Capillary Flow Porometer made by Porous Materials, Inc. (CFP-1200/AEX).

Breaking Strain Testing

Membrane sample strips with a size of 1" by 4.5" were cut from left, center and right of membrane roll and breaking strain was measured using a Zwick/Roell Z2.5 machine. Test samples with were precut from left (L), center (C) and right (R) locations of 10" wide membrane rolls. The left and right samples were taken from locations 1 inch away from the edge of the membrane roll. The reported values are the average of the test results of the L, C and R samples. Testing was conducted at 23° C. and 18-25% relative humidity. 0.98 newton (N) was used for load-cell performance check and the preload was 0.05N during testing. Flat grips were used with a grip pressure of 30 psi and the distance between the two grips was 1.5 inches. The testing speed was 2 inches per minute. The data was collected when the membrane was stretched to its breaking point.

EMD Soy Challenge Stream

The EMD Soy solutions used for the throughput testing were prepared as follows. 5.0 liters of Reverse Osmosis (RO) water was measured out using a graduated cylinder, 4.0 L of which was added to a 10 L plastic bucket. To the 4.0 L of water was added 67 g Hyclone dry powdered Dulbecco's Modified Eagle's medium (DMEM), with some of the reserved RO water being used to rinse the DMEM container into the bucket. The solution was then covered and mixed at 300 rpm with a large stir bar for 20 minutes. 18.5 g of sodium bicarbonate was added to the solution, and the weigh boat rinsed with the reserved RO water. The solution was covered and mixed for 5 minutes. 5.0 g of Pluronic F-68, aka Kolliphor, was added to the solution and the weigh boat rinsed with the reserved RO water. The solution was covered and mixed for 20 minutes. The EMD Soy was added from premeasured test tubes (which contain 10 g), which were rinsed with the remaining RO water. The solution was covered and mixed for 65 minutes, after which the stirring was stopped, the stir bar removed and the solution poured into a clean 5L pressure vessel. The throughput testing began within one hour of completing the solution preparation.

Whey Challenge Stream

The whey solutions used for the throughput testing were prepared as follows. A PBS buffer was prepared using RO water. In a 10 L batch, 1000 mL of 10×PBS Liquid Concentrate PBS (Calbiochem OmniPur, Part #6507) was added to 9.0 L RO water. The solution was thoroughly mixed with impeller (Cole Parmer Stir-Pak Laboratory Mixer Model 04555-00) at setting 3 for at least 1 min. Whey (Sigma Part #W1500, Whey from bovine mild spray-dried) was added to the mixing buffer for a concentration 0.3 g/L, and allowed to mix for 20 min. The throughput testing began within 2 hours after creation of the whey solution.

Throughput Testing

Figure 6:
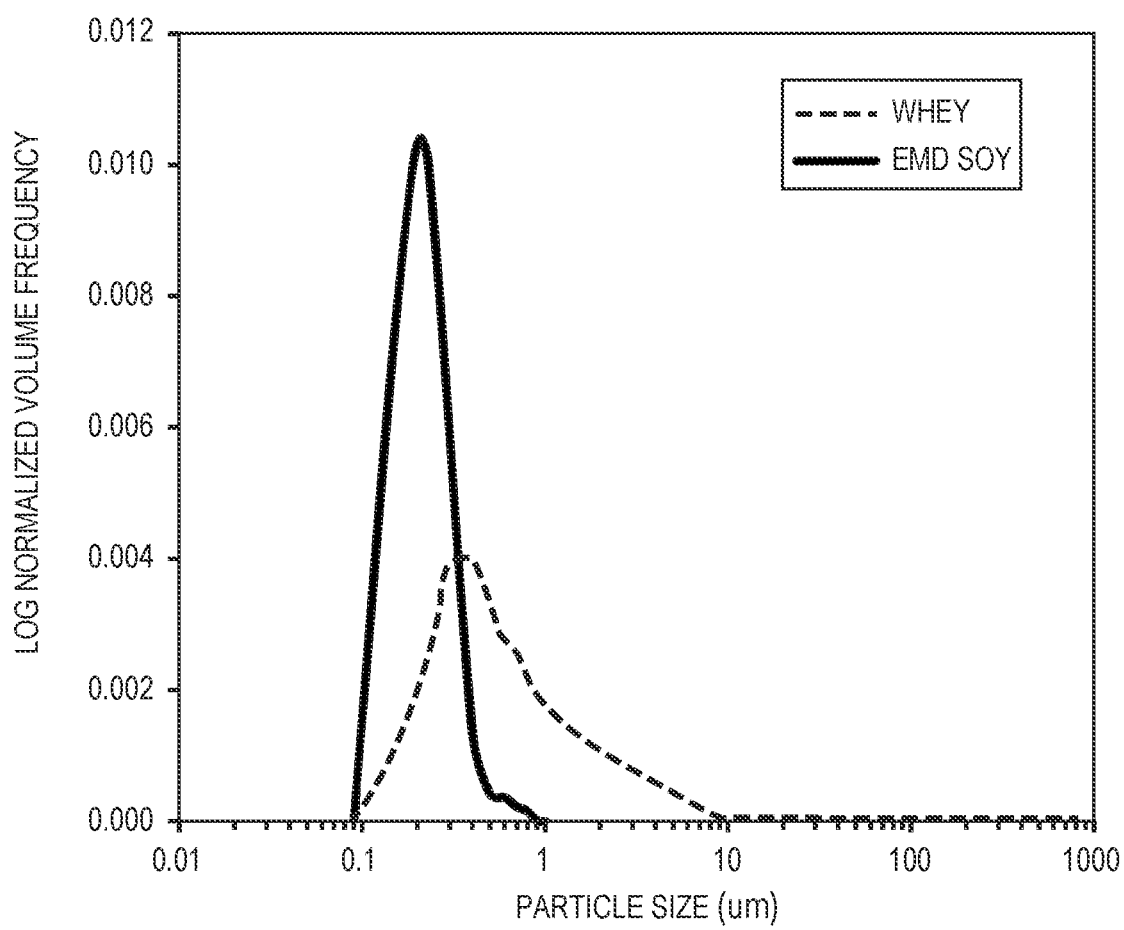
FIG. 6 is a graphical illustration of the particle size distribution of the whey and EMD soy challenge streams. Particle sizing data was gathered using a Malvern MasterSizer® particle sizer.

Two challenge streams were used in this study, both of which are listed in Table 1. These streams represented small and medium particle sizes and particle size distributions. The particle size distributions of these streams are plotted in FIG. 6. The challenge streams were concentrated to achieve a high degree of plugging (>90% flux decay at <1000l/m² of filtrate) within about 60 minutes at the test process conditions. Throughput data was recorded when the flux decay reached 90%.

TABLE 1

List of Challenge Streams for Throughput Tests.

| Sample | General description | Stream Components |
|---|---|---|
| EMD Soy | Small particle size, narrow distribution | 2.0 g/L EMD soy in DMEM with 3.7 g/L sodium bicarbonate and 1 g/L Pluronic F-68 surfactant |
| Whey | Medium particle size, medium distribution | 0.3 g/L Sigma Whey in PBS buffer |

The testing was run as disclosed by Giglia et al. in "Scaling Considerations to Maximize the High-Area Advantage," *Bioprocess International,* 15(5): 42-45 (2017), which is hereby incorporated by reference in its entirety. First the membranes were tested using OptiScale® 25 devices for clean-water permeability at 10 psi (690 mbar) at a temperature of 21-25° C. Following the water permeability test, throughput tests were done using either EMD soy or whey streams and were conducted at 10 psi (690 mbar). The throughput testing was run until the membrane permeability was reduced by at least 95% when compared to the clean water permeability. The graphical data of throughput vs bubble point can be seen in FIGS. 7 and 8. The dotted line in FIGS. 7 and 8 was constructed with the average throughput data on both Millipore Express® SHC and SHRP collected in all the examples. The Millipore Express® SHC scaling OptiScale®-25 devices were used in all the throughput test batches as an internal control. The individual sample throughput (Tput) was calculated according to following equation:

Tput=Tput Ratio Average Tput(*SHC*)

Where Tput Ratio is the ratio of individual sample throughput to Millipore Express® SHC throughput collected in individual test batch. The Average Tput(SHC) is the average Millipore Express® SHC throughput data collected in all the examples.

Example 1—Hydrophilic Triple Zone Membrane

Hydrophilic triple zone_membranes with bubble points ranging from 16.8 psi to 23.8 psi were developed via triple slot casting by blending the hydrophilic polymer PEOX (Aquazol-500, Polymer Chemistry Innovations, Inc.) in the mixes. The throughput for these membranes is at least 130% of the commercially available Millipore Express® SHC.

Three mixes including one top, one middle, and one bottom were made according to formulations in Table 2. The formulations include polyethersulfone (PES, SUMIKAEXCEL PES 5200P), N-Methyl-2-pyrrolidone (NMP), triethylene glycol (TEG), and PEOX. The mix viscosities were tested with a Brookfield viscometer (LVDV-II +P) after the mixes were thoroughly degassed. The viscosity and cloud point data are further displayed in Table 2. Six membrane samples (membranes 1A-1F) were made using a triple slot casting process with varying drum temperatures (see Table 3) for differing bubble points. The top mix flow rate was 1.4 L/hr, the middle mix flow rate was 12.6 L/hr and the bottom mix flow rate was 1.9 L/hr. The nascent membrane starts phase separation while it is on the drum with exposure to humid air. The process conditions for the formation of membranes 1A-1F are listed in see Table 3. The nascent membranes were solidified in the formation bath (water) and then extracted in hot water. Those membranes were then dried before performance testing. The membranes performance including bubble point, flow time, thickness, breaking strain and throughput is displayed in Table 4. The throughput of the membranes is all greater than 138% of Millipore Express® SHC. Furthermore, a significantly higher EMD Soy throughput (>170% of Millipore Express® SHC) can be achieved when bubble point is about ~17 psi. The breaking strain of those membranes (1A-1F) is at least 30%.

TABLE 2

Mix Formulation of Example 1 Membranes with Cloud Point and Viscosity Data

| Formulation | Top Mix | Middle Mix | Bottom Mix |
|---|---|---|---|
| PES (wt %) | 10.90 | 16.50 | 14.00 |
| PEOX (wt %) | 1.10 | 1.68 | 1.40 |
| NMP (wt %) | 30.70 | 30.02 | 29.70 |
| TEG (wt %) | 57.30 | 51.80 | 54.90 |
| Cloud Point (° C.) | 50.4 | 54.3 | 48.0 |
| Viscosity (cP) | 1140 | 8038 | 3599 |

Note:
viscosity measurements were performed at 25° C. with a S62 spindle at 3 rpm.

TABLE 3

Casting Conditions for Example 1 Membranes (Membranes 1A-1F)

| Casting Conditions for: | Dew (° C.) | Air flow rate (SCFM) | Air temp (° C.) | Line speed (fpm) | Drum temp (° C.) | Bath temp (° C.) | Extraction temp (° C.) |
|---|---|---|---|---|---|---|---|
| Membrane 1A | 5.0 | 4.4 | 24.0 | 17 | 59.3 | 68.3 | 66.2 |
| Membrane 1B | 5.0 | 4.4 | 24.0 | 17 | 59.3 | 68.3 | 66.2 |
| Membrane 1C | 5.0 | 4.4 | 24.0 | 17 | 59.3 | 68.3 | 66.2 |
| Membrane 1D | 5.2 | 4.0 | 23.1 | 17 | 61.8 | 68.3 | 65.7 |
| Membrane 1E | 5.2 | 4.0 | 23.1 | 17 | 61.8 | 68.3 | 65.7 |
| Membrane 1F | 5.2 | 4.0 | 23.1 | 17 | 61.8 | 68.3 | 65.7 |

TABLE 4

Membrane Performance of Example 1 Membranes (Membranes 1A-1F)

| Membrane ID | Bubble point (psi) | Flow time (sec/500 ml) | Thickness (μm) | Breaking strain (%) | EMD Soy throughput ratio to SHC | Whey throughput ratio to SHC |
|---|---|---|---|---|---|---|
| Membrane 1A | 23.8 | 84 | 151 | 34 | 138% | 144% |
| Membrane 1B | 23.2 | 81 | 143 | 31 | 142% | 144% |
| Membrane 1C | 23.5 | 82 | 148 | 31 | 146% | 166% |
| Membrane 1D | 16.0 | 61 | 151 | 35 | 188% | 166% |
| Membrane 1E | 17.4 | 60 | 141 | 34 | 170% | 147% |
| Membrane 1F | 16.4 | 62 | 146 | 30 | 192% | 156% |

Example 2—Triple Zone Membrane with Hydrophilic Coating

Hydrophobic triple zone membranes were produced via triple slot casting and then e-Beam modified as described in U.S. Pat. No. 4,944,879 to Steuck, which is hereby incorporated by reference in its entirety, to add a hydrophilic surface. The throughput for these membranes were greater than 130% of the commercially available Millipore Express® SHC.

The mixes were created per the formulations as shown in Table 5, similar to those of Example 1, but without addition of PEOX. The mix viscosities were tested with a Brookfield viscometer (LVDV-II +P) after the mixes were thoroughly degassed. Both mix viscosity and cloud point data are shown in Table 5. The mix viscosity is significantly lower when compared to Example 1 mixes (see Table 2) since no PEOX was added.

TABLE 5

Mix Formulation of Example 2 Membranes with Cloud Point and Viscosity Data

| Formulation | Top Mix | Middle Mix | Bottom Mix |
|---|---|---|---|
| PES (wt %) | 10.76 | 16.50 | 15.00 |
| PEOX (wt %) | 0.00 | 0.00 | 0.00 |
| NMP (wt %) | 30.00 | 28.95 | 29.47 |
| TEG (wt %) | 59.24 | 54.55 | 55.53 |
| Cloud Point (° C.) | 49.4 | 50.8 | 50.8 |
| Viscosity (cP) | 919.8 | 6169* | 3954 |

Note:
*viscosity was measured at 25° C. with S62 spindle at 1.5 rpm; all other measurements were done at 25° C. with a S62 spindle at 3 rpm A triple slot die was used during the casting of two membranes (Membranes 2A-2B). The top mix flow rate was 2.8 L/hr, the middle mix flow rate was 30.7 L/hr and the bottom mix flow rate was 5.6 L/hr. The membrane formation processes were very similar to those of Example 1. The different process conditions are disclosed in Table 6 for both membranes 2A and 2B. Before the membranes entered the formation bath and precipitated, the membrane bubble point was adjusted by varying the casting drum temperature and air exposure conditions. The line speed was set to 30 fpm. The different process conditions are disclosed in Table 6 for both membranes 2A and 2B. Water was used in the formation bath at 64.8° C. The resultant hydrophobic membranes were collected after extraction in hot water and drying.

The dried hydrophobic membranes were prewet with aqueous solutions containing 0.8 wt % N,N'-Methylenebisacrylamide and 10 wt % Hexylene glycol at room temperature. The prewetted membrane was e-Beam (PCT Broadbeam electron beam processor, Comet AG) modified at a dose of 25 kGy and rinsed with methanol and then water. The hydrophilic membranes were dried before performance testing.

TABLE 6

Conditions Casting Conditions for Example 2 Membranes (Membranes 2A-2B)

| Casting Conditions for: | Dew (° C.) | Air flow rate (SCFM) | Air temp (° C.) | Line speed (fpm) | Drum temp (° C.) | Bath temp (° C.) | Extraction temp (° C.) |
|---|---|---|---|---|---|---|---|
| Membrane 2A | 2.0 | 6 | 23.6 | 30 | 56.0 | 62.8 | 67.1 |
| Membrane 2B | 2.1 | 6 | 22.9 | 30 | 55.1 | 62.5 | 67.4 |

The membrane performance was tested as shown in Table 7, indicating the permeability of both membrane 2A and membrane 2B is about 129-140% of Millipore Express® SHC.

TABLE 7

Membrane Performance of Example 2 Membranes (Membranes 2A-2B) and Comparisons to Millipore Express® SHC Membrane

| Membrane ID | Thickness (μm) | IPA bubble point (psi) | Permeability (LMH/PSI) | Breaking strain (%) | EMD Soy throughput ratio to SHC | Whey throughput ratio to SHC |
|---|---|---|---|---|---|---|
| Millipore Express® SHC | 140/140 | 22.8 | 859 | 39 | 100% | 100% |
| Membrane 2A | 146 | 22.7 | 1201 | 37 | 135% | 142% |
| Membrane 2B | 144 | 25.2 | 1107 | 38 | 137% | 132% |

Figure 1B:
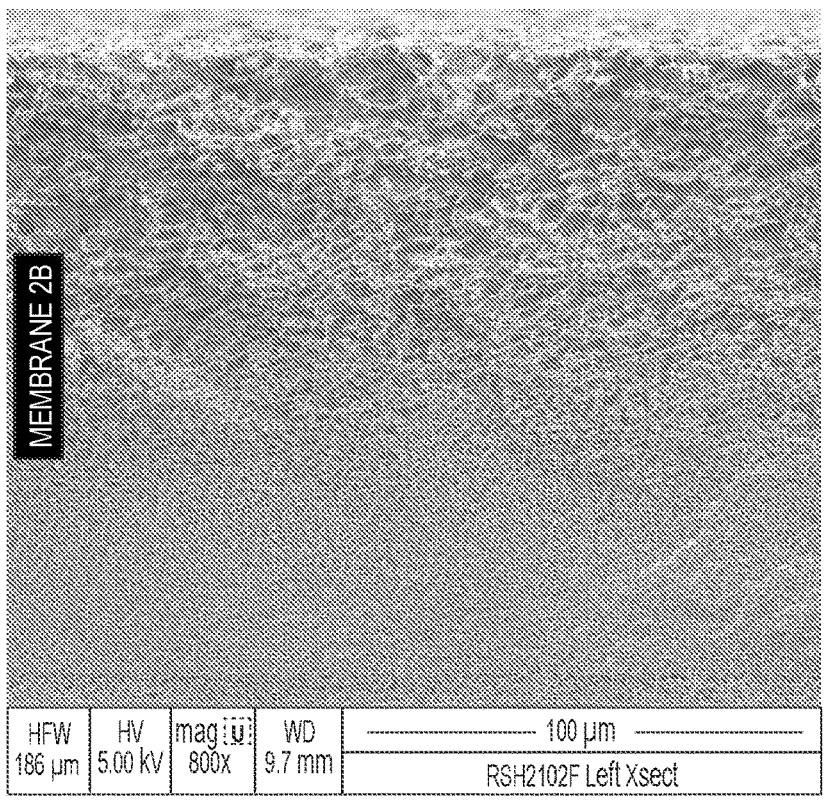

To compare with the current commercially available membrane throughput directly, Millipore Express® SHC scaling OptiScale® 25 devices were included in the throughput test. The EMD soy throughput for membranes 2A and 2B is 135-137% of Millipore Express® SHC, and the Whey throughput is 132-142% of Millipore Express® SHC. The membrane breaking strain for both membranes 2A and 2B is greater than 30%, which is required empirically for good pleated device performance. The membrane cross section SEMs for membrane 2A and membrane 2B are shown in FIGS. 1A, and 1B, respectively. In both cases, there is clear interface between zone 1 (bottom zone) and zone 3 (mid zone), and no clear interface between zone 3 (mid zone) and zone 2 (upper zone).

Example 3—Hydrophilic Triple Zone Membranes

Hydrophilic triple zone membranes were created via triple slot casting by blending PEOX (with a ratio to PES of 12 wt %) in the PES mixes. The throughput for these membranes is at least 120% of the commercially available Millipore Express® SHC membrane.

Three mixes including one top, one middle and one bottom were made according to formulations in Table 8. All three mixes were tested, and both viscosity and cloud point data are further shown in Table 8. A triple slot die was used for the casting with the top mix flow rate set to 2.5 L/hr, the middle mix flow rate of 29.0 L/hr and the bottom mix flow rate of 5.0 L/hr. Casting process conditions disclosed in Table 9 and the same process steps were followed as stated in Example 1. Eight membrane samples (membranes 3A-3H) were made by varying drum temperature for different bubble point as shown in Table 9. The membranes performance including bubble point, flow time, thickness and breaking strain were tested as shown in Table 10. The membranes throughput was tested together with Millipore Express® SHC scaling OptiScale® 25 mm devices as control. Membranes 3A-3H throughput is at least 120% of commercially available Millipore Express® SHC, and their breaking strain is greater than 30%.

TABLE 8

Mix Formulation of Example 3
Membranes with Cloud Point and Viscosity Data

| Formulation | Top Mix | Middle Mix | Bottom Mix |
| --- | --- | --- | --- |
| PES (wt %) | 10.90 | 16.50 | 14.00 |
| PEOX (wt %) | 1.30 | 1.98 | 1.68 |
| NMP (wt %) | 30.10 | 29.22 | 29.62 |
| TEG (wt %) | 57.70 | 52.30 | 54.70 |
| Cloud Point (° C.) | 48.7 | 49.6 | 48.3 |
| Viscosity (cP) | 1495 | 10918* | 4739 |

Note:
*viscosity was measured at 25° C. with S62 spindle at 1.5 rpm; all other measurements were done at 25° C. with a S62 spindle at 3 rpm

TABLE 9

Cast Conditions for Example 3 Membranes (Membranes 3 A-3H)

| Casting Conditions for: | Dew (° C.) | Air flow rate (SCFM) | Air temp (° C.) | Line speed (fpm) | Drum temp (° C.) | Bath temp (° C.) | Extraction temp (° C.) |
| --- | --- | --- | --- | --- | --- | --- | --- |
| Membranes 3A-3B | 10.0 | 6.0 | 35.0 | 30 | 61.2 | 65.6 | 36.0 |
| Membranes 3C-3E | -9.0 | 10.0 | 35.0 | 30 | 57.2 | 65.6 | 58.9 |
| Membranes 3F-3H | 8.0 | 6.0 | 35.0 | 30 | 57.2 | 65.6 | 45.9 |

TABLE 10

Membrane Performance of Example 3 Membranes (Membranes 3A-3H)

| Membrane ID | IPA bubble point (psi) | Flow time (sec/500 ml) | Thickness (μm) | Breaking strain (%) | EMD Soy throughput ratio to SHC | Whey throughput ratio to SHC |
| --- | --- | --- | --- | --- | --- | --- |
| Membrane 3A | 20.2 | 87 | 147 | 38 | 186% | 164% |
| Membrane 3B | 19.6 | 98 | 149 | 46 | 161% | 142% |
| Membrane 3C | 26.3 | 118 | 151 | 43 | 128% | 141% |
| Membrane 3D | 26.3 | 125 | 144 | 45 | 120% | 143% |
| Membrane 3E | 26.4 | 125 | 146 | 42 | 126% | 143% |
| Membrane 3F | 23.7 | 123 | 146 | 38 | 142% | 142% |
| Membrane 3G | 23.5 | 124 | 145 | 41 | 133% | 144% |
| Membrane 3H | 24.5 | 120 | 146 | 40 | 137% | 139% |

With the addition of more PEOX to the membrane, an increase in the breaking strain can be achieved when compared to the membranes of Example 1 (see Table 4)

Figure 2A:
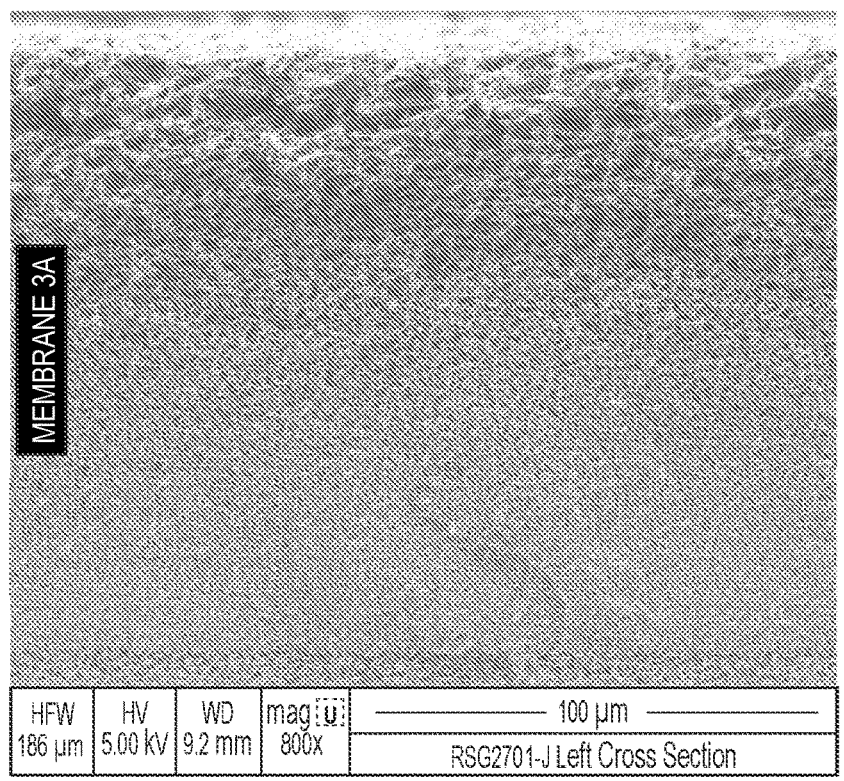
FIGS. 2A-2C are SEM micrographs of the cross section of the triple zone high throughput hydrophilic membrane 3A, membrane 3C and membrane 3F, respectively, of the present application, scale bar of 100 μm.
Figure 2B:
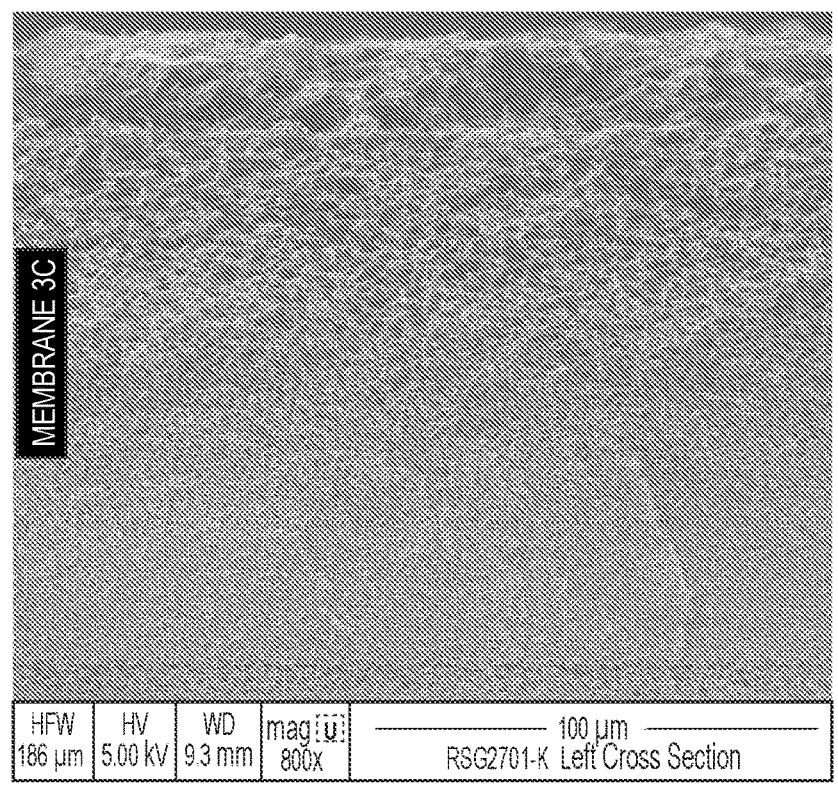
Figure 2C:
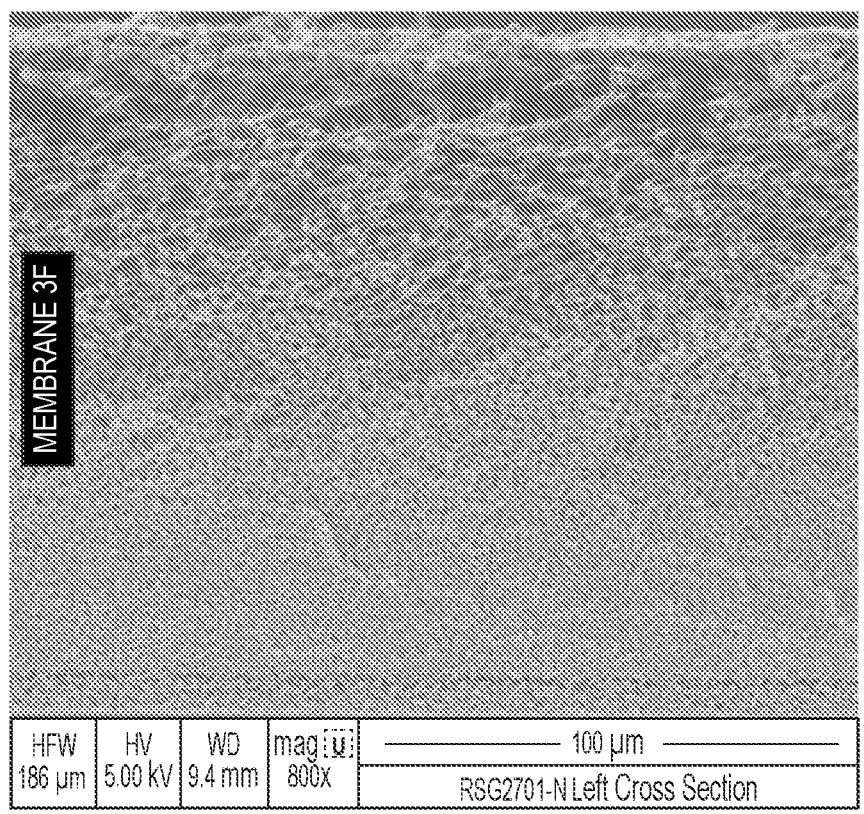

FIGS. 2A-2C contain the SEM micrographs of the cross sections of membranes 3A, 3C and 3F, respectively. Clearly, there is no interface zone in between adjacent zones made by applying triple slot casting. The zone 3 (mid zone) is asymmetric and the dominant zone which contributes to the retentive performance. The zone 2 (upper zone in FIG. 2) is very porous which is the unique zone for throughput improvement over the current Millipore Express® membranes, and Zone 1 is the bottom zone. Different from membrane 3A (FIG. 2A) and 3F (FIG. 2C), there is a demarcation line between zone 2 (upper zone) and zone 3 (mid zone) in membrane 3C (FIG. 2B).

Example 4—Hydrophilic Triple Zone Membranes

The goal of this example is to make hydrophilic PEOX/PES triple zone membranes with a much tighter pore size. The hydrophilic membranes were further modified by e-Beam irradiation at a dose of 50 kGy. The throughput for those new membranes is at least 130% of the commercially available Millipore Express® SHRP.

Formulations for the top, middle, and bottom mixes along with their properties including viscosity and cloud point are displayed in Table 11. Four different sets of formulations were used for the creation of 24 membranes (membranes 4A-4X). A Triple slot die was used for the casting with the top mix flow rate of 2.8 L/hr, the middle mix flow rate was 33.7 L/hr and the bottom mix flow rate was 5.6 L/hr. The casting processes were the same as Example 1, and the process conditions are disclosed in Table 12. The 24 membranes were further surface modified by prewetting them in water and then exposing them to e-Beam at a dose of 50 kGy. The membranes were rinsed with methanol followed by water before being dried. The membrane performance was tested after the e-Beam modification and the data is displayed in Table 13. Membranes with much higher bubble points (33-46 psi) were made in this process with throughputs of at least 130% of the commercially available Millipore Express® SHRP. Most of the membranes breaking strain were greater than 40%.

TABLE 11

Mix Formulations of Example 4 Membranes with Cloud Point and Viscosity Data

| Membrane Formulations for: | Formulation | Top Mix | Middle Mix | Bottom Mix |
|---|---|---|---|---|
| Membranes 4A-4G | PES (wt %) | 13.00 | 17.50 | 14.50 |
| | PEOX (wt %) | 1.30 | 1.75 | 1.45 |
| | NMP (wt %) | 29.21 | 29.80 | 32.16 |
| | TEG (wt %) | 56.49 | 50.95 | 51.89 |
| | Cloud Point (° C.) | 47.6 | 54.1 | 60.5 |
| | Viscosity (cP) | 4019 | 18326* | 5739 |
| Membranes 4H-4J | PES (wt %) | 13.00 | 17.50 | 15.00 |
| | PEOX (wt %) | 1.30 | 1.75 | 1.80 |
| | NMP (wt %) | 29.21 | 29.80 | 30.48 |
| | TEG (wt %) | 56.49 | 50.95 | 52.72 |
| | Cloud Point (° C.) | 47.6 | 54.1 | 54.0 |
| | Viscosity | 4019 | 18326* | 9578 |
| Membranes 4K-4M | PES (wt %) | 10.90 | 17.50 | 15.00 |
| | PEOX (wt %) | 1.31 | 1.75 | 1.80 |
| | NMP (wt %) | 30.89 | 29.80 | 30.48 |
| | TEG (wt %) | 56.90 | 50.95 | 52.72 |
| | Cloud Point (° C.) | 50.0 | 54.1 | 54.0 |
| | Viscosity (cP) | 2340 | 18326* | 9578 |
| Membranes 4N-4T | PES (wt %) | 10.90 | 18.50 | 15.00 |
| | PEOX (wt %) | 1.31 | 1.85 | 1.80 |
| | NMP (wt %) | 30.89 | 29.63 | 30.48 |
| | TEG (wt %) | 56.90 | 50.02 | 52.72 |
| | Cloud Point (° C.) | 50.0 | 54.3 | 54.0 |
| | Viscosity (cP) | 2340 | 19346** | 9578 |
| Membranes 4U-4X | PES (wt %) | 13.00 | 18.50 | 14.50 |
| | PEOX (wt %) | 1.30 | 1.85 | 1.45 |
| | NMP (wt %) | 29.21 | 29.63 | 32.16 |
| | TEG (wt %) | 56.49 | 50.02 | 51.89 |
| | Cloud Point (° C.) | 47.6 | 54.3 | 60.5 |
| | Viscosity (cP) | 4019 | 19346** | 5739 |

Note:
*viscosity was measured at 25 °C with S62 at 1.5 rpm;
**viscosity was measured at 35° C. with S64 spindle at 10 rpm, otherwise it is measured at 25° C. with S62 spindle at 3 rpm

TABLE 12

Casting Conditions for Example 4 Membranes (Membranes 4A-4X)

| Casting Conditions for: | Dew (° C.) | Air flow rate (SCFM) | Air temp (° C.) | Line speed (fpm) | Drum temp (° C.) | Bath temp (° C.) | Extraction temp (° C.) |
|---|---|---|---|---|---|---|---|
| Membrane 4A | −2.8 | 6.1 | 30.1 | 30 | 53.1 | 66.9 | 66.3 |
| Membrane 4B | 0.4 | 6.1 | 30.1 | 30 | 53.1 | 66.7 | 66.5 |
| Membrane 4C | 3.5 | 6.0 | 30.1 | 30 | 53.1 | 66.8 | 66.4 |
| Membrane 4D | 4.1 | 6.0 | 30.1 | 30 | 54.2 | 67.0 | 66.5 |
| Membrane 4E | 4.0 | 6.0 | 30.1 | 30 | 55.1 | 67.1 | 66.4 |
| Membrane 4F | 4.2 | 6.0 | 30.1 | 30 | 56.1 | 66.9 | 66.6 |
| Membrane 4G | 4.0 | 5.9 | 30.1 | 30 | 57.0 | 67.2 | 66.5 |
| Membrane 4H | −2.6 | 5.9 | 30.1 | 30 | 53.1 | 66.8 | 64.4 |
| Membrane 4I | 0.4 | 6.0 | 30.1 | 30 | 53.1 | 67.0 | 66.2 |
| Membrane 4J | 3.7 | 5.9 | 30.1 | 30 | 53.1 | 64.5 | 66.6 |
| Membrane 4K | −2.8 | 6.2 | 30.2 | 30 | 53.1 | 66.9 | 65.7 |
| Membrane 4L | 0.5 | 6.2 | 30.2 | 30 | 53.1 | 67.1 | 65.1 |
| Membrane 4M | 4.2 | 6.1 | 30.0 | 30 | 53.1 | 67.0 | 66.2 |
| Membrane 4N | −2.4 | 5.9 | 30.1 | 30 | 53.3 | 66.3 | 59.8 |
| Membrane 4O | 0.5 | 6.1 | 30.0 | 30 | 53.3 | 66.3 | 63.1 |
| Membrane 4P | 4.3 | 6.0 | 30.1 | 30 | 53.3 | 66.5 | 66.1 |
| Membrane 4Q | 3.8 | 5.8 | 30.1 | 30 | 56.4 | 66.6 | 66.5 |
| Membrane 4R | 4.0 | 5.9 | 30.1 | 30 | 57.3 | 66.7 | 66.5 |
| Membrane 4S | 4.1 | 5.8 | 30.1 | 30 | 55.2 | 66.5 | 66.5 |
| Membrane 4T | 3.9 | 6.1 | 30.1 | 30 | 54.1 | 66.4 | 66.4 |
| Membrane 4U | −2.4 | 6.1 | 30.1 | 30 | 53.3 | 65.9 | 62.4 |
| Membrane 4V | 0.8 | 6.0 | 30.1 | 30 | 53.3 | 66.0 | 58.3 |
| Membrane 4W | 4.0 | 6.0 | 30.1 | 30 | 53.3 | 66.0 | 59.2 |
| Membrane 4X | 3.9 | 5.9 | 30.1 | 30 | 58.4 | 66.5 | 64.2 |

TABLE 13

Membrane Performance of Example 4 Membranes (Membranes 4A-4X)

| Membrane ID | IPA bubble point (psi) | Flow time (sec/500 ml) | Thickness (μm) | Breaking strain (%) | EMD Soy throughput ratio to SHRP | Whey throughput ratio to SHRP |
|---|---|---|---|---|---|---|
| Membrane 4A | 39.9 | 206 | 156 | 48 | 159% | 164% |
| Membrane 4B | 39.9 | 210 | 159 | 38 | 163% | 173% |
| Membrane 4C | 38.6 | 174 | 159 | 47 | 191% | 185% |
| Membrane 4D | 38.4 | 185 | 155 | 51 | 199% | 189% |
| Membrane 4E | 37.0 | 155 | 152 | 50 | 198% | 205% |
| Membrane 4F | 35.2 | 144 | 146 | 46 | 233% | 217% |
| Membrane 4G | 33.4 | 175 | 150 | 46 | 241% | 228% |
| Membrane 4H | 39.9 | 210 | 158 | 45 | 187% | 242% |
| Membrane 4I | 39.6 | 190 | 156 | 47 | 179% | 220% |
| Membrane 4J | 38.2 | 185 | 157 | 44 | 222% | 227% |
| Membrane 4K | 41.3 | 155 | 156 | 46 | 173% | 230% |
| Membrane 4L | 40.6 | 200 | 150 | 48 | 164% | 211% |
| Membrane 4M | 39.7 | 200 | 152 | 47 | 193% | 234% |
| Membrane 4N | 46.8 | 340 | 159 | 56 | 133% | 130% |
| Membrane 4O | 45.5 | 268 | 161 | 56 | 139% | 168% |
| Membrane 4P | 44.6 | 256 | 162 | 56 | 153% | 167% |
| Membrane 4Q | 40.0 | 210 | 163 | 55 | 179% | 177% |
| Membrane 4R | 38.7 | 188 | 161 | 49 | 188% | 177% |
| Membrane 4S | 41.9 | 210 | 159 | 49 | 206% | 179% |
| Membrane 4T | 44.1 | 225 | 161 | 55 | 181% | 179% |
| Membrane 4U | 45.4 | 255 | 159 | 48 | 159% | 132% |
| Membrane 4V | 45.4 | 255 | 162 | 51 | 167% | 133% |
| Membrane 4W | 44.2 | 235 | 159 | 53 | 172% | 133% |
| Membrane 4X | 37.4 | 165 | 158 | 57 | 191% | 188% |

Figure 7A:
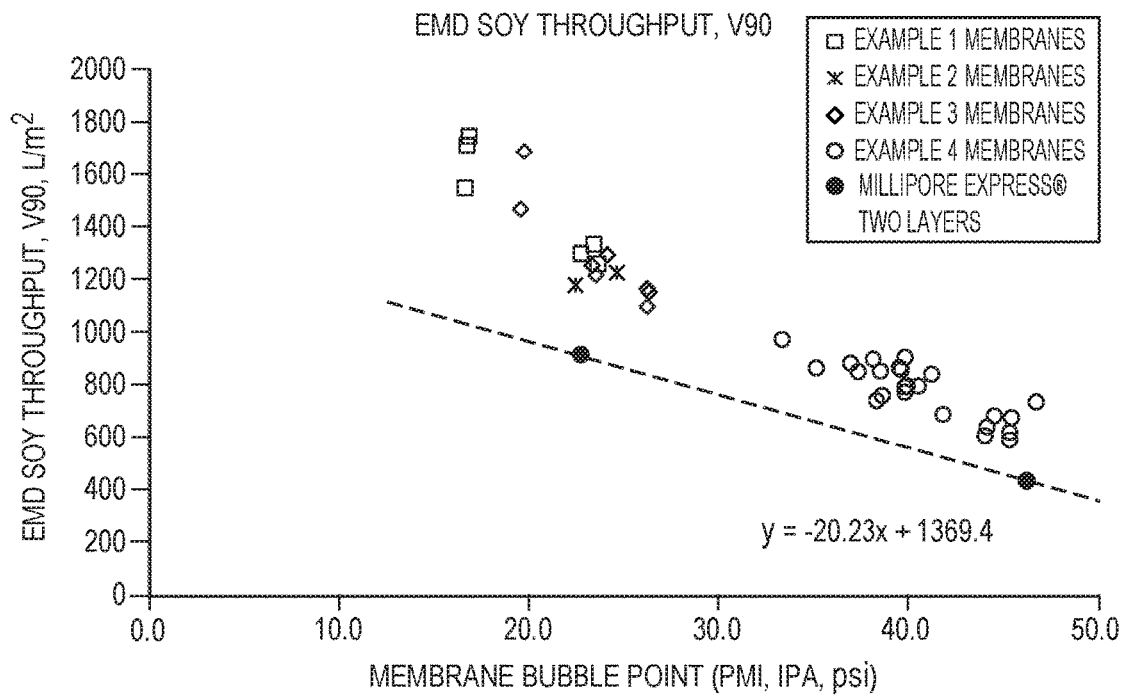
FIGS. 7A-7B are graphical illustrations of the throughput of EMD soy (FIG. 7A), and whey (FIG. 7B), through the membranes of the present application.
Figure 7B:
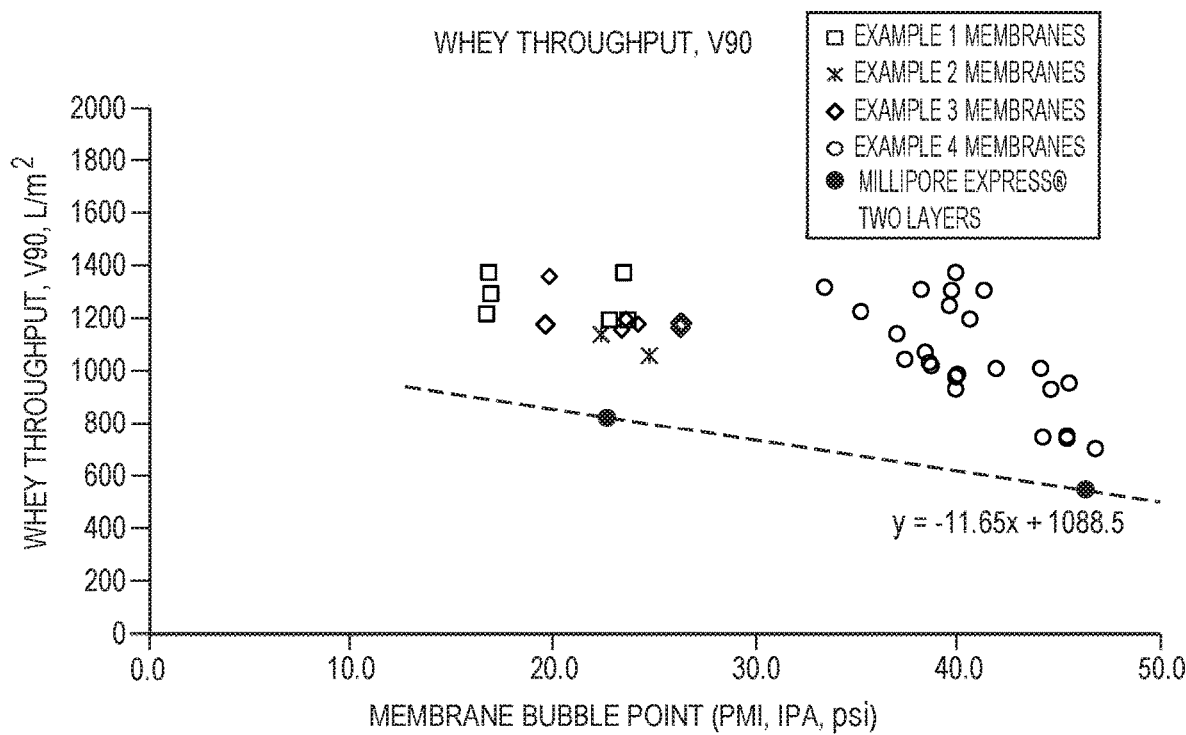

Both Millipore Express® SHC and SHRP scaling OptiScale®-25 mm devices were included as control during all those throughput testing. As shown in FIG. 7, membrane throughput decreases as membrane bubble point increases, and all the membranes made in this example showed higher throughput, and all were above the dotted line. More than 150% of commercially available Millipore Express® SHRP throughput is achieved when the membrane bubble point is between 35 to 40 psi as shown in Table 13.

Example 5—Throughput Comparison to Commercially Available Membranes

The throughput of membranes taken from commercially available filters having bubble points ranging from 10 psi to 50 psi were tested as a comparison to the membranes of the present application.

Figure 8A:
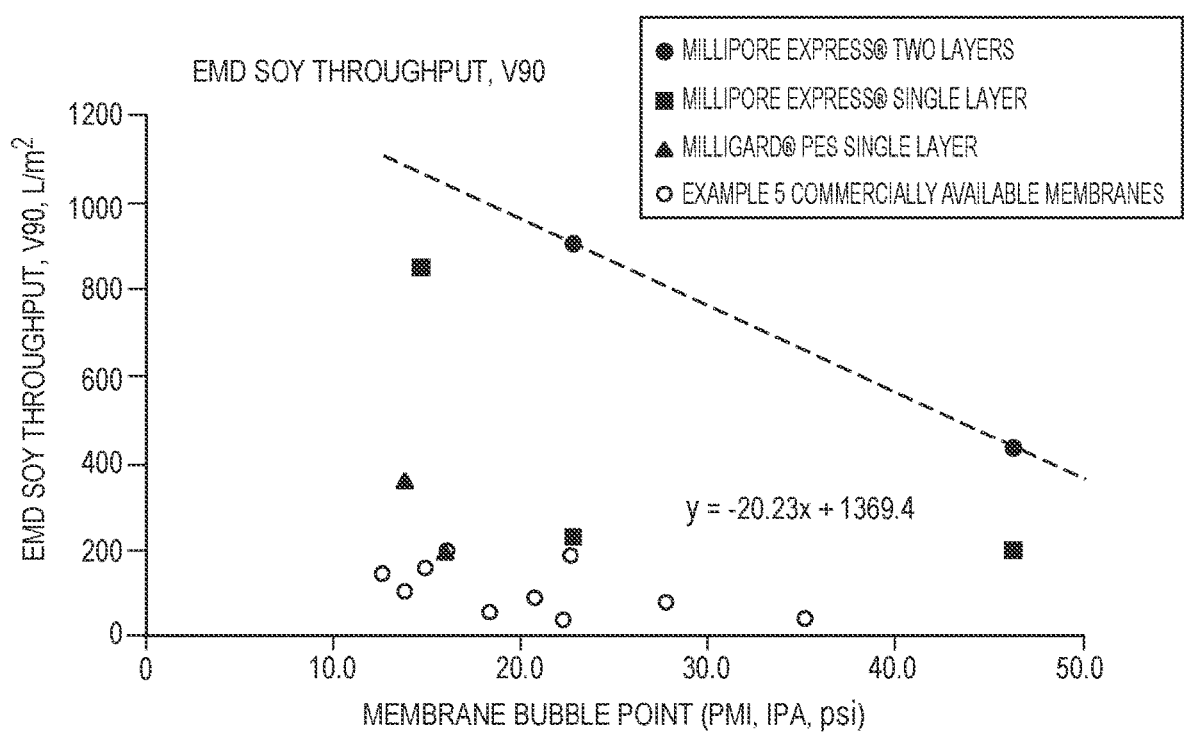
FIGS. 8A-8B are graphical illustrations of the throughput of EMD soy (FIG. 8A), and whey (FIG. 8B), through the membranes from commercially available filters.
Figure 8B:
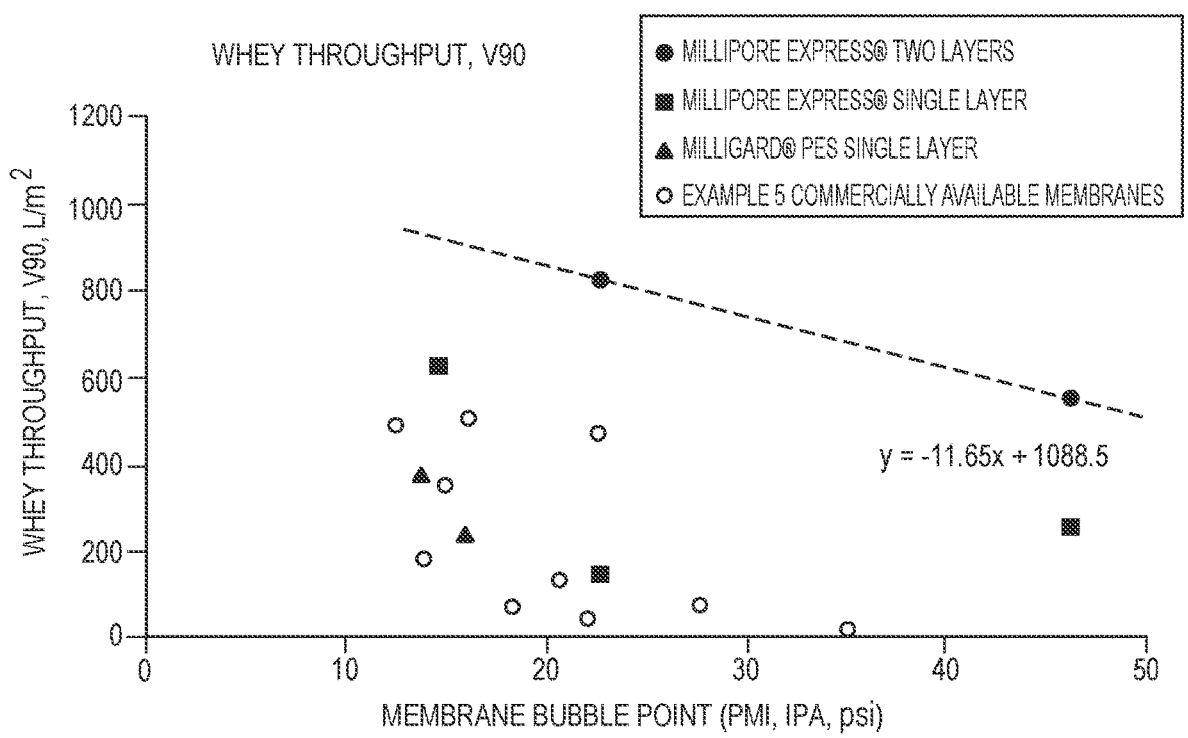

Table 14 lists the membranes taken from different filters and used for the comparative throughput testing. Both Millipore Express® SHC and SHRP scaling OptiScale®-25 devices were included as controls during the throughput test. As shown in FIGS. 8A-8B, the throughput of all the commercially available membranes is much lower than that of Millipore Express® filters as indicated on the dashed line.

TABLE 14

Bubble Point of Membranes Taken from Commercially Available Filters

| Commercial Membrane Filter | Bubble Point (psi) |
|---|---|
| Fluorodyne ® II 0.45 μm—downstream layer | 13.9 |
| Supor ® 0.2 μm—upstream layer | 16.1 |
| Supor ® 0.2 μm—downstream layer | 20.7 |
| Supor ® machV EAV 0.2 | 22.7 |
| Fluorodyne ® 11 0.1 μm—downstream layer | 27.7 |
| Sartoguard ® PES 0.2—downstream layer | 14.9 |
| Sartopore ® Platinum—upstream layer | 12.6 |
| Sartopore ® Platinum—downstream layer | 22.2 |
| Sartopore ® 2 0.1—upstream layer | 18.4 |
| Sartopore ® 2 0.1—downstream layer | 35.2 |
| Millipore Express ® SHC—upstream layer | 14.7 |
| Millipore Express ® SHC—downstream layer | 22.8 |
| Millipore Express ® SHRP—downstream layer | 46.3 |
| Milligard ® PES 0.45—downstream layer | 13.8 |
| Milligard ® PES 0.2—downstream layer | 16.0 |

Example 6—Pleatability for Hydrophilic Triple Zone Membranes

Figure 9A:
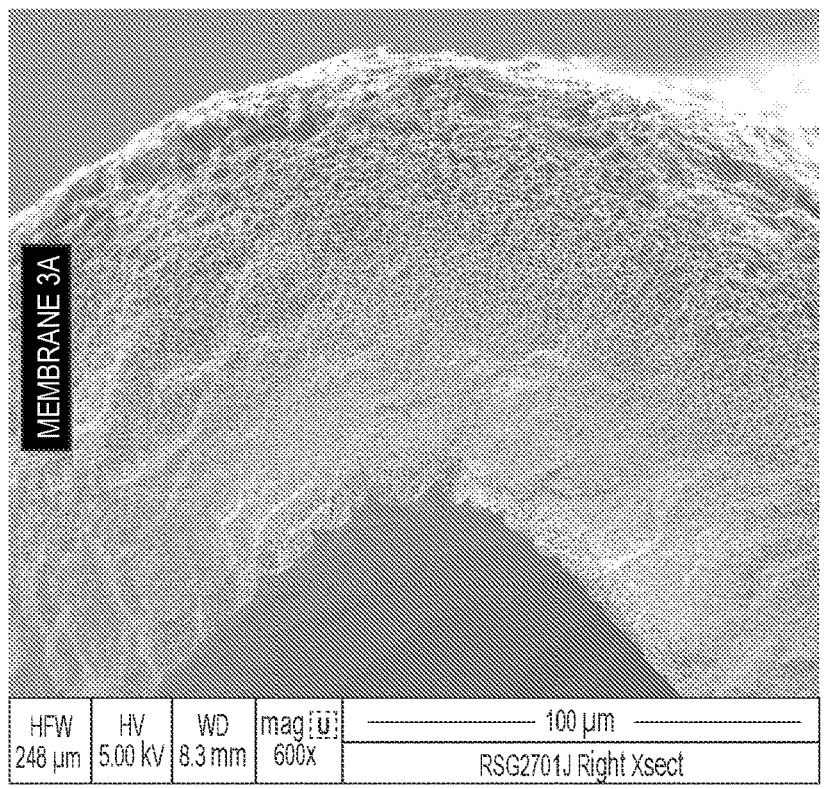
FIGS. 9A-9B are SEM micrographs of the pleated triple zone hydrophilic membrane 3A and membrane 3C, respectively, scale bar of 100 μm.
Figure 9B:
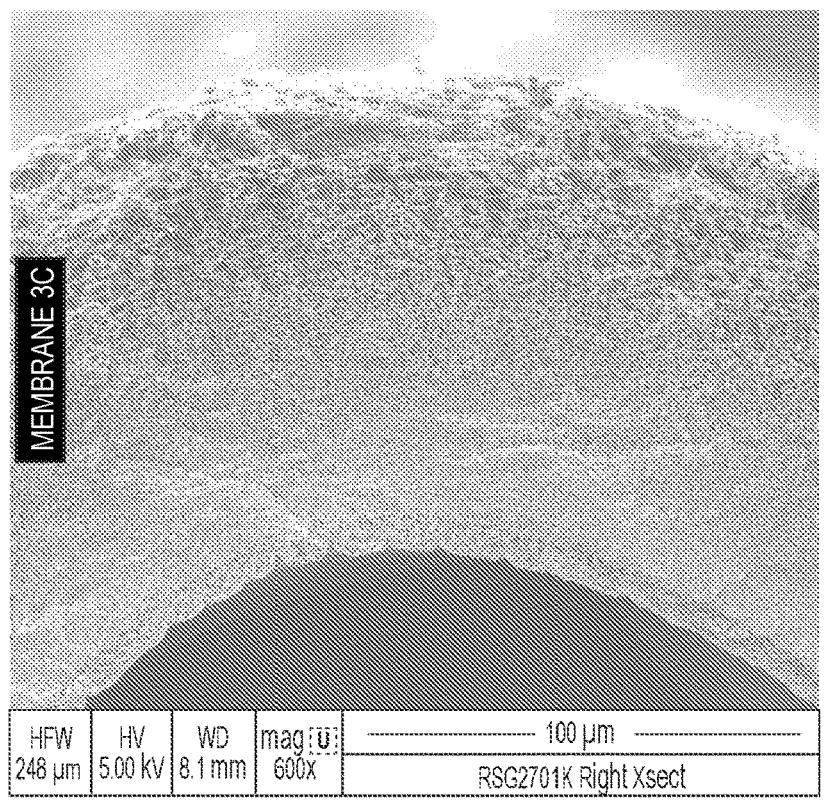

Membranes 3A and 3C, as were made in Example 3, were pleated to confirm that there are no cracks formed during the pleating process of the membranes of the present application. TYPAR® with a thickness of 178 μm was used as both an upstream and downstream support. The membranes were pleated at a speed of 50 pleats/min with a pleat height of 0.465 inches. After pleating, the cross section SEM of the pleated membranes was taken, and shown in FIGS. 9A-9B. There was no clear membrane cracking formed in the pleated membrane cross section, indicating that these membranes are robust enough for current pleating process.

Example 7—Pleatability for Commercially Available Membranes

Two commercially available Millipore Express® PLUS 0.2 μm and Millipore Express® 0.5 μm membranes which were developed for high throughput applications were tested for their pleatability.

The throughput, breaking strain and pleatability testing of the membranes were conducted as described herein, and the results are displayed in Table 15.

TABLE 15

Membrane Performance of Commercially Available Membranes

| Membrane | IPA bubble point (psi) | Permeability (L/m²-hr-Psi) | Thickness (μm) | Breaking strain (%) | EMD Soy throughput ratio to SHC | Whey throughput ratio to SHC |
|---|---|---|---|---|---|---|
| Millipore Express ® PLUS 0.2 μm | 20.0 | 1531.9 | 170 | 15 | 120% | 109% |
| Millipore Express ® 0.5 μm | 14.7 | 3300.0 | 140 | 5 | 94% | 76% |

Figure 10A:
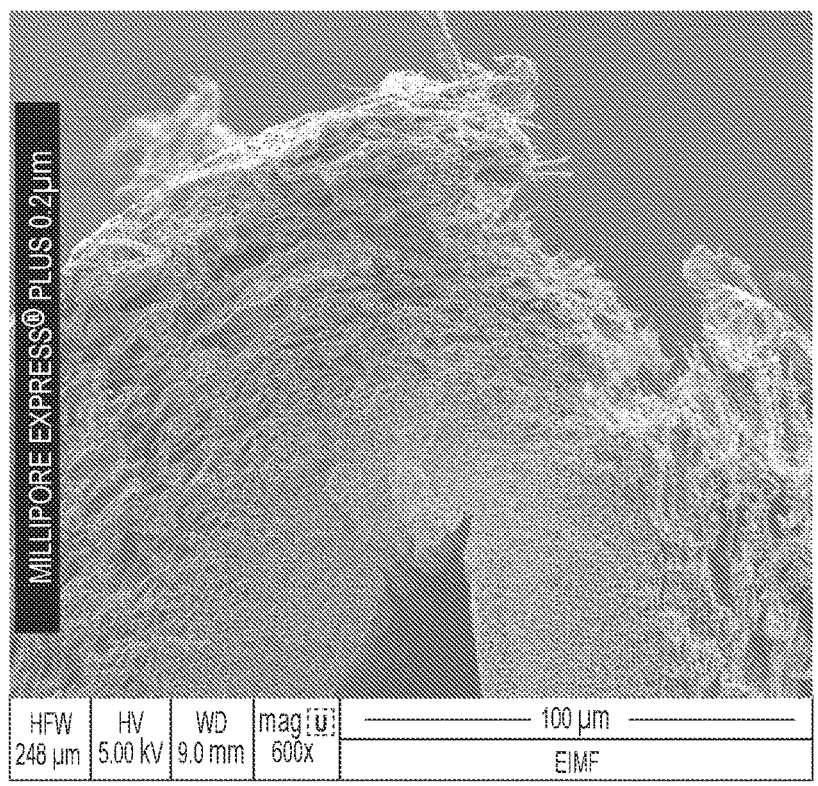
FIGS. 10A-10B are SEM micrographs of the pleated commercially available membranes Millipore Express® PLUS 0.2 μm (FIG. 10A) and Millipore Express® 0.5 μm (FIG. 10B), scale bar of 100 μm.
Figure 10B:
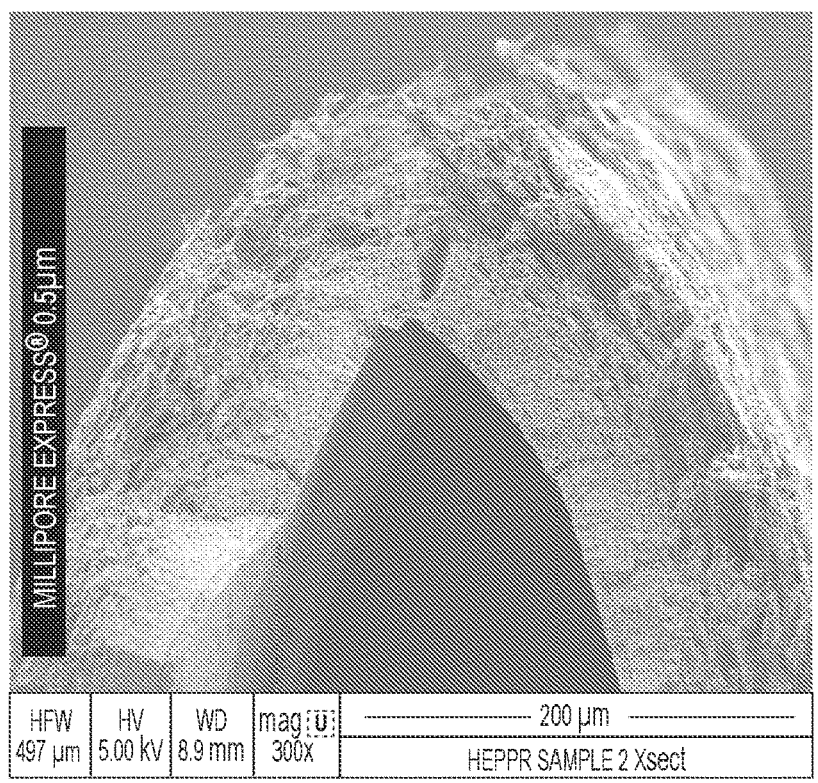

Both Millipore Express® PLUS 0.2 μm and Millipore Express® 0.5 μm membranes are single layer membranes and were developed for high throughput performance (see Table 15). However, their breaking strength is much lower at 15% and 5%, respectively. Those two membranes were pleated at the same conditions as stated in Example 6 and their pleated membrane SEMs are shown in FIGS. 10A-10B. Clearly, severe cracking was formed during the pleating process on both Millipore Express® PLUS 0.2 μm and Millipore Express® 0.5 μm membranes.

Although preferred embodiments have been depicted and described in detail herein, it will be apparent to those skilled in the relevant art that various modifications, additions, substitutions, and the like can be made without departing from the spirit of the present application and these are therefore considered to be within the scope of the present application as defined in the claims which follow.

What is claimed:

1. A multizone, unsupported, microporous, high throughput filtration membrane having a bubble point (in psi) of from about 15 to 50 and a breaking strain of at least 20%, comprising:
    a first microporous zone which is symmetric or asymmetric, wherein pore sizes range from 0.02 to 20 μm;
    a second microporous zone which is symmetric or asymmetric, wherein pore sizes range from 0.05 to 200 μm; and
    a third microporous zone which is asymmetric, wherein pore sizes range from 0.01 to 0.8 μm, wherein the third microporous zone is positioned between the first and second microporous zones with the first, second, and third microporous zones being integral with one another and wherein the membrane has a throughput (in L/m²), when measured using whey broth, which is greater than −11.65x+1088.5, where x is the bubble point (in psi), or a throughput, when using EMD Soy broth, which is greater than −20.23x+1369.4, where x is the bubble point (in psi).

2. The membrane of claim 1, wherein the first microporous zone is 5-140 μm thick, the second microporous zone is 10-140 μm thick, and the third microporous zone is 50-140 μm thick.

3. The membrane of claim 1, wherein the membrane has a total thickness of 65-300 μm.

4. The membrane of claim 1, wherein the membrane has a throughput (in L/m²), when measured using whey broth, which is greater than −11.65x+1088.5, where x is the bubble point (in psi).

5. The membrane of claim 4, wherein the membrane has a throughput (in L/m²), when measured using whey broth, which is greater than −11.65x+1188.5, where x is the bubble point (in psi).

6. The membrane of claim 5, wherein the membrane has a throughput (in L/m²), when measured using whey broth, which is greater than −11.65x+1288.5, where x is the bubble point (in psi).

7. The membrane of claim 1, wherein the membrane has a throughput (in L/m²), when measured using EMD Soy broth, which is greater than −20.23x+1369.4, where x is the bubble point (in psi).

8. The membrane of claim 7, wherein the membrane has a throughput (in L/m²), when measured using EMD Soy broth, which is greater than −20.23x+1469.4, where x is the bubble point (in psi).

9. The membrane of claim 8, wherein the membrane has a throughput (in L/m²), when measured using EMD Soy broth, which is greater than −20.23x+1569.4, where x is the bubble point (in psi).

10. The membrane of claim 1, wherein the membrane has a breaking strain of at least 25%.

11. The membrane of claim 10, wherein the membrane has a breaking strain of at least 30%.

12. The membrane of claim 1, wherein the first, second, and third microporous zones comprise one or more polymers independently selected from the group consisting of PVDF, polyamides, polyimides, polyether sulphones, polysulphones, polyaryl sulphones, PVC, PET, polycarbonates, cellulose, regenerated cellulose, cellulose esters, polystyrenes, polyetherimides, acrylic polymers, methacrylic polymers, and copolymers of acrylic or methacrylic polymers.

13. The membrane of claim 1, wherein the first, second, and/or third microporous zones are hydrophilic.

14. The membrane of claim 13, wherein the first, second, and/or third microporous zones comprise a hydrophilic polymer independently selected from the group consisting of polyacrylic acid, polyvinylalcohol, polyvinylacetate, polyvinylpyrrolidone, polyethyleneglycol, polyvinylpyridine, polyethyleneimine, and polyoxazoline.

15. The membrane according to claim 14, wherein the hydrophilic polymer comprises poly (2-ethyl-2-oxazoline).

16. The membrane according to claim 14, wherein the hydrophilic polymer is cross-linked.

17. The membrane according to claim 16, wherein the hydrophilic polymer is cross-linked by electron beam.

18. The membrane according to claim 17, wherein the hydrophilic polymer is cross-linked by electron beam with a dose of from about 20 to 150 kGy.

19. The membrane of claim 14, wherein the first, second, and/or third microporous zones independently comprise polyether sulfone, and poly (2-ethyl-2-oxazoline).

20. The membrane of claim 1, wherein the membrane is capable of being pleated without degradation of membrane retentive performance.

21. The membrane of claim 1, wherein the membrane is pleated.

22. The membrane of claim 1 further comprising:
a hydrophilic coating over the membrane.

23. A filtration cartridge comprising:
a housing; and
the multizone, unsupported, microporous, high throughput filtration membrane recited in of claim 1 positioned within the housing.

24. A multizone, unsupported, microporous, high throughput filtration membrane comprising:
a first microporous zone which is symmetric or asymmetric, wherein pore sizes range from 0.02 to 20 μm;
a second microporous zone which is symmetric or asymmetric, wherein pore sizes range from 0.05 to 200 μm; and
a third microporous zone which is asymmetric, wherein pore sizes range from 0.01 to 0.8 μm, wherein the third microporous zone is positioned between the first and second microporous zones with the first, second, and third microporous zones being integral with one another and wherein the first, second, and/or third microporous zones comprise a blend of a first polymer selected from the group consisting of PVDF, polyamides, polyimides, polyether sulphones, polysulphones, polyaryl sulphones, PVC, PET, polycarbonates, cellulose, regenerated cellulose, cellulose esters, polystyrenes, polyetherimides, acrylic polymers, methacrylic polymers, and copolymers of acrylic or methacrylic polymers, and a second polymer wherein the second polymer is selected from one or more hydrophilic polymers from the group consisting of polyacrylic acid, polyvinylalcohol, polyvinylacetate, polyvinylpyrrolidone, polyethyleneglycol, polyvinylpyridine, polyethyleneimine, and polyoxazoline and wherein the membrane has a breaking strain of at least 20%, and has a throughput (in L/m²), when measured using whey broth, which is greater than −11.65x+1088.5, where x is a bubble point (in psi), or a throughput, when using EMD Soy broth, which is greater than −20.23x+1369.4, where x is a bubble point (in psi).

25. A filtration cartridge comprising:
a housing; and
a pleated membrane positioned within the housing, wherein the pleated membrane comprises a multizone, unsupported, microporous, high throughput filtration membrane recited in claim 24,
wherein the housing contains greater than 0.11 m² of effective membrane area per inch of housing height.

26. An unsupported, microporous, high throughput filtration three-layer membrane having an asymmetric first microporous zone, wherein pore sizes range from 0.02 to 20 μm;
a second asymmetric microporous zone, wherein pore sizes range from 0.05 to 200 μm; and
a third asymmetric microporous zone, wherein pore sizes range from 0.01 to 0.8 μm, with a breaking strain of at least 20%, and having a bubble point (in psi) of from about 15 to 50, wherein the membrane has a throughput (in L/m²), when measured using whey broth, which is greater than −11.65x+1088.5, where x is the bubble point (in psi), or a throughput, when using EMD Soy broth, which is greater than −20.23x+1369.4, where x is the bubble point (in psi).

* * * * *